(12) United States Patent
Itonaga

(10) Patent No.: US 7,301,882 B2
(45) Date of Patent: Nov. 27, 2007

(54) OPTICAL PICKUP DEVICE AND DIFFRACTIVE OPTICAL ELEMENT

(75) Inventor: Makoto Itonaga, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 542 days.

(21) Appl. No.: 11/034,986

(22) Filed: Jan. 14, 2005

(65) Prior Publication Data

US 2005/0157623 A1    Jul. 21, 2005

(30) Foreign Application Priority Data

Jan. 16, 2004    (JP) .......................... P2004-009543

(51) Int. Cl.
*G11B 7/00*    (2006.01)

(52) U.S. Cl. ................................. 369/112.23

(58) Field of Classification Search ..................... None
See application file for complete search history.

(56) References Cited

U.S. PATENT DOCUMENTS

| | | | |
|---|---|---|---|
| 5,526,338 A * | 6/1996 | Hasman et al. ............... | 369/94 |
| 6,275,461 B1 * | 8/2001 | Yoo et al. .............. | 369/112.01 |
| 6,836,378 B2 * | 12/2004 | Sugi et al. .................. | 359/719 |
| 6,930,974 B2 * | 8/2005 | Kunimatsu ............. | 369/112.23 |
| 7,012,876 B2 * | 3/2006 | Hendriks et al. ...... | 369/112.24 |
| 2005/0007931 A1 * | 1/2005 | Sakamoto et al. ..... | 369/112.01 |
| 2005/0025028 A1 * | 2/2005 | Hirai et al. ............ | 369/112.05 |
| 2005/0063283 A1 * | 3/2005 | Ori et al. ............... | 369/112.08 |

FOREIGN PATENT DOCUMENTS

| | | |
|---|---|---|
| JP | 06-082725 | 3/1994 |
| JP | 06-250081 | 9/1994 |
| JP | 2002-236253 | 8/2002 |
| JP | 2003-270525 | 9/2003 |
| JP | 2003-272213 | 9/2003 |

OTHER PUBLICATIONS

Katsuhiro Koike et al., "Phase shift element for Blu-ray Disc/ DVD compatibility", *Technical digest for ODS 2003*, WA6, pp. 271-273.

* cited by examiner

*Primary Examiner*—William R. Korzuch
*Assistant Examiner*—Peter Vincent Agustin
(74) *Attorney, Agent, or Firm*—The Nath Law Group; Jerald L. Meyer

(57) ABSTRACT

When a wavelength having the same value as a reference wavelength λ1 of a first laser light is set to a designed wavelength λ, a diffractive optical element has: an inner circular side irregular diffraction pattern portion, in which a plurality of irregular portions in which a height of a convex portion is set to approximately 1λ-fold of the designed wavelength λ with respect to a concave portion are repeated, being formed in an annular shape in an inner circular area having a predetermined diameter for the correction of a spherical aberration generated due to a difference in substrate thickness between first and second optical recording mediums centering on a central point through which an optical axis runs while gradually changing a pitch of the irregular portions in a radial direction toward the outer circular side; and an outer circular side tiered diffraction pattern portion which is intended to improve a chromatic aberration with respect to the first laser light by forming in an annular shape in an outer circular area outside the inner circular side irregular diffraction pattern portion a plurality of tiers by setting a height of each tier to approximately mλ-fold (where m is a natural number which does not include 0) of the designed wavelength λ or by setting the same while changing a value of m for each tier.

4 Claims, 17 Drawing Sheets

ASPHERICAL ATTACHED SURFACES

LONGITUDINAL ABERRATION OF
SINGLE OBJECTIVE LENS

LONGITUDINAL ABERRATION OF
ENTIRE OPTICAL SYSTEM

LONGITUDINAL ABERRATION IN Blu-ray Disc

OPTICAL PICKUP DEVICE AND DIFFRACTIVE OPTICAL ELEMENT

BACKGROUND OF THE INVENTION

1. Field of the Invention

The present invention relates to an optical pickup device comprising at least: a chromatic aberration correction element which corrects a chromatic aberration with respect to a first laser light; first and second laser light separating means for separating the first laser light and a second laser light from each other; a diffractive optical element which corrects a spherical aberration generated due to a difference in substrate thickness between first and second optical recording mediums; and an objective lens whose numerical aperture (NA) is not less than 0.75, and to a diffractive optical element when selectively recording or reproducing the first optical recording medium and the second optical recording medium by using the first laser light having a short wavelength for the first optical recording medium having a small substrate thickness and the second laser light having a wavelength longer than that of the first laser light for the second optical recording medium having a substrate thickness larger than that of the first optical recording medium.

2. Description of the Related Art

In general, optical recording mediums such as a discoid optical disc or a card-shaped optical card are often used since they can record information signals of, e.g., video information, sound information or computer data on tracks spirally or concentrically formed on a transparent substrate with a high density, and access a desired track at a high speed when reproducing recorded tracks.

Although an optical disc which serves as this type of optical recording medium, e.g., a DVD (Digital Versatile Disc) or the like has been already commercially available, a Blu-ray Disc which can record or reproduce information signals with a very higher density than the DVD has been recently vigorously developed in order to achieve a higher density with respect to the optical disc.

The above-described DVD records or reproduces information signals on a signal surface placed at a position apart from a laser beam incidence surface by approximately 0.6 mm by applying a laser beam obtained by narrowing down a laser light whose wavelength is approximately 650 mm by an objective lens whose numerical aperture (NA) is approximately 0.6. At this time, a recording capacity of the DVD is approximately 4.7 GB (gigabytes) on one side when a diameter of a disc substrate is 12 cm.

On the other hand, the above-described Blu-ray Disc has been developed so that it can record or reproduce information signals on a signal surface placed at a position apart from a laser beam incidence surface by approximately 0.1 mm by applying a laser beam obtained by narrowing down a laser light whose wavelength is not more than 450 nm by an objective lens whose numerical aperture (NA) is not less than 0.75. At this time, a recording capacity of the Blu-ray Disc is approximately 25 GB (gigabytes) on one side when a diameter of a disc substrate is 12 cm.

Meanwhile, with advance of the development of the Blu-ray Disc, there has been developed an optical pickup device which can perform recording or reproduction while assuring downward compatibility between the Blu-ray Disc whose recording density is an extra-high density and the DVD whose recording density is lower than that of the Blu-ray Disc by using one objective lens (e.g., Japanese Patent Application Laid-open No.2002-236253 (pp. 57-58, FIG. 31), and Phase Shift Element for Blu-ray Disc/DVD Compatibility, Katsuhiro Koike et., al., Technical digest for ODS 2003, WA6).

Further, an optical pickup device which can correct a chromatic aberration with respect to the Blu-ray Disc has been developed (e.g., Japanese Patent Application Laid-open No.2003-272213 (pp.5-6, FIG. 2), and Japanese Patent Application Laid-open No.2003-270525 (p.6, FIG. 3)).

Furthermore, an optical pickup device which can correct a chromatic aberration with respect to a general optical disc has been also developed (e.g., Japanese Patent Application Laid-open No.hei6(1994)-250081 (p.4, FIG. 8) and Japanese Patent Application Laid-open No.hei6(1994) 82725 (p.2, FIG. 1)).

FIG. 1 is a view schematically showing an optical system of an optical pickup device according to Conventional Example 1. FIG. 2 is a view schematically showing an optical system of an optical pickup device according to Conventional Example 2. FIG. 3 is a view schematically showing an optical system of an optical pickup device according to Conventional Example 3. FIG. 4 is a view schematically showing an optical system of an optical pickup device according to Conventional Example 4. FIG. 5 is a view schematically showing an optical system of an optical pickup device according to Conventional Example 5. FIG. 6 is a view schematically showing an optical system of an optical pickup device according to Conventional Example 6.

First, an optical pickup device 110 according to Conventional Example 1 shown in FIG. 1 is disclosed in the Japanese Patent Application Laid-Open No.2000-236253. The device will be briefly described with reference to the document. The optical pickup device 110 according to Conventional Example 1 is configured so that a first optical disc 101 having a transparent substrate whose thickness is 0.1 mm (e.g., a next-generation high-density optical disc using a blue laser) and a second optical disc 102 having a transparent substrate whose thickness is 0.6 mm (e.g., a DVD) can be selectively applied.

The optical pickup device 110 according to Conventional Example 1 comprises: a first semiconductor laser 111 which emits a first laser light (a blue laser light) having a wavelength of approximately 400 nm in accordance with the first optical disc (e.g., a next-generation high-density optical disc) 101; a second semiconductor laser 112 which emits a second laser light (a red laser light) having a wavelength of approximately 650 nm in accordance with the second optical disc (e.g., a DVD); first and second beam splitters 113 and 114; a collimator lens 116 which is movable in an optical axis direction by a one-dimensional actuator 115; a ¼ wave plate 117; an aperture 118; an objective lens 120 which has a numerical aperture NA of 0.7 or above in order to form images of the first and second laser lights on the first and second optical discs by a two-dimensional actuator 119 and has a diffraction annular lens formed on at least one surface; and a cylindrical lens 121 and a photodetector 122 which detect return lights from the first and second discs 101 and 102.

Moreover, respective divergent light beams emitted from the first and second semiconductor lasers 111 and 112 are selectively condensed on information recording surfaces 101a and 102a of the first and second optical discs 101 and 102 through the first and second beam splitters 113 and 114, the collimator lens 116 and the ¼ wave plate 117 and the aperture 118, thereby forming respective spots. In this example, in cases where there are errors in substrate thicknesses of the first and second optical discs, where there are errors in respective oscillation wavelengths due to manufacture errors of the first and second semiconductor lasers 111 and 112, or where there are errors in thicknesses of the lenses constituting the condenser optical system, a generated spherical aberration is corrected by movement of the collimator lens 116.

Additionally, since the objective lens 120 condenses a light beam from the first semiconductor laser 111 within a diffraction limit in an image side numerical aperture NA1, information recorded on the first optical disc 101 at a high density can be reproduced. On the other hand, since the objective lens 120 converges a light beam from the second semiconductor laser 112 within a diffraction limit in an image side numerical aperture NA2, information recorded on the second optical disc 102 can be reproduced. Further, when converging a light beam from the second semiconductor laser 112 on the information recording surface 102*a* of the second optical disc 102, since a light beam which passes through an area from the image side numerical aperture NA1 to the counterpart NA2 is formed as a flare component by an effect of the diffraction annular lens formed on at least one surface of the objective lens 120, the light beam passing through the area from the image side numerical aperture NA1 to the counterpart NA2 does not form a spot on the information recording surface 102*a* of the second optical disc 102 even if the whole light beam from the second semiconductor laser 112 is caused to pass through the aperture 118 determined by NA1. Therefore, aperture switching means for NA1 and NA2 does not have to be provided.

An optical pickup device 130 according to Conventional Example 2 shown in FIG. 2 is disclosed in the above reference by Katsuhiro Koike et. al. Giving a brief description in conjunction with the reference by Katsuhiro Koike et. al., in the optical pickup device 130 according to Conventional Example 2, a phase shift element (PSE) 132 and an objective lens 133 whose numerical aperture (NA) is 0.85 are attached in a lens holder 131, a Blu-ray Disc compatible with a wavelength of 405 nm and a DVD compatible with a wavelength of 650 nm can be selectively applied, and a spherical aberration generated due to a difference in substrate thickness between the Blu-ray Disc and the DVD can be corrected by the phase shift element 132.

In this example, the phase shift element 132 (PSE) has a tiered diffraction pattern portion 132*a* formed on an inner portion thereof, and a flat portion 132*b* is formed on a circular portion around the tiered diffraction pattern portion 132*a*.

A first laser light having a wavelength of 405 nm is transmitted through the tiered diffraction pattern portion 132*a* and the flat portion 132*b* of the phase shift element 132 as it is with respect to the Blu-ray Disc so that the first laser light is condensed on the Blu-ray Disc. On the other hand, a second laser light having a wavelength of 650 nm is transmitted through the tiered diffraction pattern portion 132*a* only of the phase shift element 132 with respect to the DVD so that the second laser light is condensed on the DVD by using the objective lens 133 while correcting a spherical aberration by the tiered diffraction pattern portion 132*a*.

An optical pickup device 140 according to Conventional Example 3 shown in FIG. 3 is a device disclosed in Japanese Patent Application Laid-open No.2003-272213. Giving a brief description in conjunction with this publication, the optical pickup device 140 according to Conventional Example 3 comprises: a beam expander 141 comprising a concave lens 141A and a convex lens 141B; a triplet 142 which is formed by attaching a concave lens 142A, a convex lens 142B and a concave lens 142C and serves as chromatic aberration correcting means; and an objective lens 143 whose numerical aperture is not less than 0.7. This optical pickup device 140 can correct a spherical aberration and a chromatic aberration with respect to a Blu-ray Disc 101 for a laser light L whose wavelength is approximately 403 nm.

In this example, the beam expander 141 changes the parallelism of a light by adjusting a gap between the two lenses 141A and 141B, thereby correcting a spherical aberration of the objective lens 143. Furthermore, the triplet 142 corrects an error component in a focal direction generated by a chromatic aberration of the objective lens 143.

An optical pickup device 150 according to Conventional Example 4 shown in FIG. 4 is disclosed in Japanese Patent Application Laid-open No.2003-270525. Giving a brief description in conjunction with this publication, the optical pickup device 150 according to Conventional Example 4 comprises: a beam expander 151 comprising a concave lens 151 and a Fresnel lens 151B; and an objective lens 152 whose numerical aperture is not less than 0.7, and can correct a spherical aberration and a chromatic aberration with respect to a Blu-ray Disc 101 for a laser light L whose wavelength is approximately 405 nm.

In this example, the beam expander 151 changes the parallelism of a light by adjusting a gap between the two lenses 151A and 151B, thereby correcting a spherical aberration of the objective lens 152. Furthermore, an analog blaze 151Ba (or a tiered blaze) is formed to the Fresnel lens 151B in the beam expander 151, and functions as a convex lens with respect to the concave lens 151A. A focal distance of the Fresnel lens 151B is set so that an error component in a focal direction generated by a chromatic aberration of the objective lens 152 can be corrected.

An optical pickup device 160 according to Conventional Example 5 shown in FIG. 5 is disclosed in Japanese Patent Application Laid-open No.Hei6(1994)-250081. Giving a brief description in conjunction with this publication, the optical pickup device 160 according to Conventional Example 5 comprises: a chromatic aberration correction element 161 comprising a positive lens 161A and a negative lens 161B; and an objective lens 162. This optical pickup device 160 can correct a spherical aberration generated due to a wavelength change with respect to an optical disc 103 by the chromatic aberration correction element 161 by forming attached surfaces of the positive lens 161A and the negative lens 161B in the chromatic aberration correction element 161 into an aspherical surface.

An optical pickup device 170 according to Conventional Example 6 shown in FIG. 6 is disclosed in Japanese Patent Application Laid-open No.Hei6(1994)-82725. Giving a brief description in conjunction with this publication, the optical pickup device 170 according to Conventional Example 6 comprises: a chromatic aberration correction element 171 whose flat surface vertical to an optical axis is formed as a concentric annular zone having a tiered shape on at least one of a light incidence end surface 171*a* and a light projection end surface 171*b*; and an objective lens 172, and can correct a chromatic aberration with respect to an optical disc 103 by using the single chromatic aberration correction element 171.

Meanwhile, in the optical pickup device 110 according to Conventional Example 1, the first optical disc 101 having a transparent substrate whose thickness is 0.1 mm and the second optical disc 102 having a transparent substrate whose thickness is 0.6 mm can be selectively applied by the objective lens 120 whose numerical aperture NA is not less than 0.7 and which has the diffraction annular lens formed on at least one surface, but a pitch of the diffraction annular lens formed on at least one surface of the objective lens 120 is narrow, and machining of the objective lens 120 is hard, which may possibly adversely affect the lens performance.

Furthermore, in the optical pickup device 130 according to Conventional Example 2, although the Blu-ray Disc compatible with a wavelength of 405 nm and the DVD compatible with a wavelength of 650 nm can be selectively applied by the phase shift element 132 and the objective lens 133 whose numerical aperture NA is 0.85, a spherical aberration is corrected with respect to the second laser light by the tiered diffraction pattern portion 132a formed on the inner circular portion of the phase shift element 132. However, in regard to the first laser light which is transmitted through the tiered diffraction pattern portion 132a formed on the inner portion and the flat portion 132b formed on the outer circular portion as it is, if a wavelength error is generated, the correction of a spherical aberration with respect to the Blu-ray Disc becomes lax since the outer circular portion is flat.

Moreover, in the optical pickup device 140 according to Conventional Example 3, although a spherical aberration and a chromatic aberration can be corrected with respect to the Blu-ray Disc 101 by the beam expander 141, the triplet 142 and the objective lens 143 whose numerical aperture is not less than 0.7, assuring the downward compatibility between the Blu-ray Disc 101 and the DVD (not shown) to be recorded or reproduced is not considered. Additionally, since the triplet 142 which serves as the chromatic aberration correcting means must be designed in such a manner that it can correct an epaxial chromatic aberration excessively in the entire optics, a curvature radius of the attached surface becomes small, and machining is difficult. Furthermore, in cases where a spherical aberration is corrected by the beam expander 141, changing a gap in the beam expander 141 can suffice, but a time required to correct the spherical aberration becomes long.

Moreover, in the optical pickup device 150 according to Conventional Example 4, since a spherical aberration and a chromatic aberration can be corrected by the beam expander 151 only which has the blaze, the equivalent performance can be obtained with respect to the Blu-ray Disc 101 even if the number of components is reduced to be less than that in Conventional Example 3. However, assuring the downward compatibility between the Blu-ray Disc 101 and the DVD (not shown) to be recorded or reproduced is not considered. Additionally, when the analog blaze 151Ba (or the tiered blaze) is formed to the Fresnel lens 151B in the beam expander 151, a pitch becomes narrow, and machining is thereby difficult.

Additionally, in the optical pickup device 160 according to Conventional Example 5 mentioned above, although the chromatic aberration correction element 161 has a function which corrects a spherical aberration generated due to a wavelength change, since the attached surfaces of the positive lens 161A and the negative lens 161B in this chromatic aberration correction element 161 is formed into a spherical surface, the chromatic aberration correction element 161 is hard to be produced.

Further, in the optical pickup device 170 according to Conventional Example 6, since a chromatic aberration can be corrected with respect to the optical disc 103 by the chromatic aberration correction element 171 formed into a tiered shape, this device can be likewise applied to the extra-high density Blu-ray Disc, but assuring the downward compatibility between the Blu-ray Disc and the DVD to be recorded or reproduced is not considered.

SUMMARY OF THE INVENTION

Thus, there has been demanded an optical pickup device and a diffractive optical element which can assure the downward compatibility between a first optical recording medium (e.g., a Blu-ray Disc) whose recording density is an extra-high density and a second optical recording medium (e.g., a DVD) whose recording density is lower than that of the first light recording medium by using one objective lens in order to record or reproduce information, have less fluctuations in spherical aberrations when a wavelength change occurs, lead the design of a chromatic aberration correction element which is simultaneously used for the Blu-ray Disc to facilitate manufacture, and involve no increase in the number of elements.

To achieve this aim, there is provided an optical pickup device which selectively records or reproduces a first optical recording medium, and a second optical recording medium having a recording density lower than that of the first optical recording medium and a substrate thickness larger than that of the first optical recording medium, comprising: a first laser light source which emits a first laser light whose wavelength is not more than 450 nm in accordance with the first optical recording medium; a second laser light source which emits a second laser light whose wavelength is longer than that of the first laser light in accordance with the second optical recording medium; a chromatic aberration correction element which corrects a chromatic aberration with respect to the first laser light; first and second laser light separating means for separating the first laser light and the second laser light from each other; a diffractive optical element which corrects a spherical aberration generated due to a difference in substrate thickness between the first and second recording mediums; and an objective lens which has a numerical aperture (NA) set to 0.75 or above for the first optical recording medium, in which at least one of respective surfaces thereof backing onto each other is formed into an aspherical surface and which converges the first and second laser lights on the respective signal surfaces of the first and second optical recording mediums, wherein, when a wavelength having the same value as a reference wavelength $\lambda 1$ of the first laser light is set to a designed wavelength $\lambda$, the diffractive optical element has: an inner circular side irregular diffraction pattern portion, in which a plurality of irregular portions in which a height of a convex portion is set to approximately $1\lambda$-fold of the designed wavelength $\lambda$ with respect to a concave portion are repeated, being formed in an annular shape in an inner circular area having a predetermined diameter for the correction of a spherical aberration generated due to a difference in substrate thickness between the first and second optical recording mediums centering on a central point through which an optical axis runs while gradually changing a pitch of the irregular portions in a radial direction toward the outer circular side; and an outer circular side tiered diffraction pattern portion which is intended to improve a chromatic aberration with respect to the first laser light by forming in an annular shape in an outer circular area outside the inner circular side irregular diffraction pattern portion a plurality of tiers by setting a height of each tier to approximately $m\lambda$-fold (where m is a natural number which does not include 0) of the designed wavelength $\lambda$ or by setting the same while changing a value of m for each tier.

According to the optical pickup device of the present invention, in particular, when a wavelength having the same value as the reference wavelength $\lambda 1$ of the first laser light is set to the designed wavelength $\lambda$, since the diffractive optical element has: the inner circular side irregular diffraction pattern portion, in which a plurality of irregular portions in which a height of a convex portion is set to approximately $1\lambda$-fold of the designed wavelength $\lambda$ with respect to a concave portion are repeated, being formed in an annular shape in the inner circular area having a predetermined diameter for the correction of a spherical aberration generated due to a difference in substrate thickness between the first and second optical recording mediums centering on a central point through which the optical axis runs while gradually changing a pitch of the irregular portions in the radial direction toward the outer circular side; and the outer circular side tiered diffraction pattern portion intended to improve a chromatic aberration with respect to the first laser light by forming in an annular shape in the outer circular area outside the inner circular side irregular diffraction pattern portion a plurality of tiers by setting a height of each tier to an approximately $m\lambda$-fold (where m is a natural number which does not include 0) of the designed wavelength $\lambda$ or setting the same while changing a value of m for each tier, a spherical aberration with respect to the second laser light can be corrected by the inner circular side irregular diffraction pattern portion, and a chromatic aberration can be corrected with respect to the first laser light L1 the outer circular side tiered diffraction pattern portion. Therefore, information can be excellently recorded on or reproduced from the first optical recording medium and the second optical recording medium, and the design of the chromatic aberration correction element can be led to facilitation of manufacture.

Further, to achieve this aim, there is provided an optical pickup device which selectively records or reproduces a first optical recording medium, and a second optical recording medium having a recording density lower than that of the first optical recording medium and a substrate thickness larger than that of the first optical recording medium comprising: a first laser light source which emits a first laser light whose wavelength is not more than 450 nm in accordance with the first optical recording medium; a second laser light source which emits a second laser light whose wavelength is longer than that of the first laser light in accordance with the second optical recording medium; a chromatic aberration correction element which corrects a chromatic aberration with respect to the first laser light; first and second laser light separating means for separating the first laser light and the second laser light from each other; a diffractive optical element which corrects a spherical aberration generated due to a difference in substrate thickness between the first and second recording mediums; and an objective lens which has a numerical aperture (NA) set to 0.75 or above for the first optical recording medium, in which at least one of respective surfaces thereof backing onto each other is formed into an aspherical surface and which converges the first and second laser lights on the respective signal surfaces of the first and second optical recording mediums, wherein, when a wavelength having the same value as a reference wavelength $\lambda 1$ of the first laser light is set to a designed wavelength $\lambda$, the diffractive optical element has: an inner circular side tiered diffraction pattern portion, in which a plurality of tiers each having a height set to approximately $2\lambda$-fold of the designed wavelength $\lambda$ are determined as one set and the plurality of such sets are repeated, being formed in an annular shape in an inner circular area having a predetermined diameter for the correction of a spherical aberration generated due to a difference in substrate thickness between the first and second optical recording mediums centering on a central point through which an optical axis runs while gradually changing a pitch of the tiers in a radial direction toward the outer circular side; and an outer circular side tiered diffraction pattern portion which is intended to improve a chromatic aberration with respect to the first laser light by forming in an annular shape in an outer circular area outside the inner circular side tiered diffraction pattern portion a plurality of tiers by setting a height of each tier to approximately $m\lambda$-fold (where m is a natural number which does not include 0) of the designed wavelength $\lambda$ or by setting the same while changing a value of m for each tier.

According to the optical pickup device of the present invention, particularly, when a wavelength having the same value as the reference wavelength $\lambda 1$ of the first later light is set to the designed wavelength $\lambda$, since the diffractive optical element has: an inner circular side tiered diffraction pattern portion, in which a plurality of tiers in which a height of each tier is set to approximately $2\lambda$-fold of the designed wavelength $\lambda$ is determined as one set and a plurality of such sets are repeated, being formed into an annular shape in the inner circular area having a predetermined diameter for the correction of a spherical aberration generated due to a difference in substrate thickness between the first and second optical recording mediums centering on the central point through which the optical axis runs while gradually changing a pitch of the tiers in the radial direction toward the outer circular side; and the outer circular side tiered diffraction pattern portion intended to improve a chromatic aberration with respect to the first laser light by forming in an annular shape in the outer circular area outside the inner circular side tiered diffraction pattern portion a plurality of tiers by setting a height of each tier to an approximately $m\lambda$-fold (where m is a natural number which does not include 0) of the designed wavelength $\lambda$ or by setting the same while changing a value of m for each tier, a spherical aberration with respect to the second laser light can be corrected by the inner peripheral tiered diffraction pattern portion, and a chromatic aberration can be corrected with respect to the first laser light by the outer circular side tiered diffraction pattern portion. Therefore, information can be excellently recorded on or reproduced from the first optical recording medium and the second optical recording medium, and the design of the chromatic aberration correction element can be led to facilitation of manufacture.

Furthermore, to achieve the above-described aim, there is provided a diffractive optical element which corrects a spherical aberration generated due to a difference in substrate thickness between a first recording medium having a small substrate thickness and a second optical recording medium having a substrate thickness larger than that of the first recording medium when selectively recording or reproducing the first optical recording medium and the second optical recording medium by using a first laser light having a wavelength which is not more than 450 nm for the first optical recording medium and a second laser light having a wavelength longer than that of the first laser light for the second optical recording medium, wherein, when a wavelength having the same value as a reference wavelength $\lambda 1$ of the first laser light is set to a designed wavelength $\lambda$, the diffractive optical element has: an inner circular side irregular diffraction pattern portion, in which a plurality of irregular portions in which a height of a convex portion is set to approximately $1\lambda$-fold of the designed wavelength $\lambda$ with respect to a concave portion are repeated, being formed in an annular shape in an inner circular area having a predetermined diameter for the correction of the spherical aberration generated due to the difference in substrate thickness between the first and second optical recording mediums centering on a central point through which an optical axis runs while gradually changing a pitch of the irregular portions in a radial direction toward the outer circular side; and an outer circular side tiered diffraction pattern portion which is intended to improve a chromatic aberration with respect to the first laser light by forming in an annular shape in an outer circular area outside the inner circular side irregular diffraction pattern portion a plurality of tiers by setting a height of each tier to approximately $m\lambda$-fold (where m is a natural number which does not include 0) of the designed wavelength $\lambda$ or by setting the same while changing a value of m for each tier.

According to the diffractive optical element of the present invention, like the first invention concerning the optical pickup device mentioned above, information can be excellently recorded on or reproduced from the first optical recording medium and the second optical recording medium, and the design of the chromatic aberration correction element can be led to facilitation of manufacture.

Moreover, to achieve the above-described aim, there is provided a diffractive optical element which corrects a spherical aberration generated due to a difference in substrate thickness between a first recording medium having a small substrate thickness and a second optical recording medium having a substrate thickness larger than that of the first recording medium when selectively recording or reproducing the first optical recording medium and the second optical recording medium by using a first laser light having a wavelength which is not more than 450 nm for the first optical recording medium and a second laser light having a wavelength longer than that of the first laser light for the second optical recording medium, wherein, when a wavelength having the same value as a reference wavelength $\lambda 1$ of the first laser light is set to a designed wavelength $\lambda$, the diffractive optical element has: an inner circular side tiered diffraction pattern portion, in which a plurality of tiers each having a height set to approximately $2\lambda$-fold of the designed wavelength $\lambda$ are determined as one set and the plurality of such sets are repeated, being formed in an annular shape in an inner circular area having a predetermined diameter for the correction of the spherical aberration generated due to the difference in substrate thickness between the first and second optical recording mediums centering on a central point through which an optical axis runs while gradually changing a pitch of the tiers in a radial direction toward the outer circular side; and an outer circular side tiered diffraction pattern portion which is intended to improve a chromatic aberration with respect to the first laser light by forming in an anuular shape in an outer circular area outside the inner circular side tiered diffraction pattern portion a plurality of tiers by setting a height of each tier to approximately $m\lambda$-fold (where m is a natural number which does not include 0) of the designed wavelength $\lambda$ or by setting the same while changing a value of m for each tier.

According to the diffractive optical element of the present invention, like the second invention concerning the optical pickup device mentioned above, information can be excellently recorded on or reproduced from the first optical recording medium and the second optical recording medium, and the design of the chromatic aberration correction element can be led to facilitation of manufacture.

The nature, principle and utility of the invention will become more apparent from the following detailed description when read in conjunction with the accompanying drawings.

DESCRIPTION OF THE PREFERRED EMBODIMENTS

Embodiments of an optical pickup device and a diffractive optical element according to the present invention will now be described in detail in the order of Embodiment 1 and Embodiment 2 with reference to FIGS. 7 to 29.

An optical pickup device according to the present invention comprises at least: a chromatic aberration correction element which corrects a chromatic aberration with respect to a first laser light; first and second laser light separating means for separating the first laser light and a second laser light from each other; a diffractive optical element which corrects a spherical aberration generated due to a difference in substrate thickness between first and second optical recording mediums; and an objective lens which is designed for a first optical recording medium based on next-generation optical disc standards and has a numerical aperture (NA) of 0.75 or above, when recording or reproducing information onto or from the first optical recording medium whose recording density is an extra-high density (e.g., a Blu-ray Disc) and a second optical recording mediumhaving a recording density lower than that of the first optical recording medium (e.g., a DVD) by using one objective lens while assuring downward compatibility. In particular, the diffractive optical element has an inner circular side irregular diffraction pattern portion having an irregular shape or an inner circular side tiered diffraction pattern portion having a tiered shape being formed into a circular shape in an inner circular area based on a first phase function curve obtained by using a later-described first phase function and an outer circular side tiered diffraction pattern portion having a tiered phase being formed into a circular shape in an outer circular area based on a second phase function curve obtained by using a later-described second phase function. Therefore, a spherical aberration can be corrected with respect to the second laser light L2 by the inner circular side irregular diffraction pattern portion or the inner circular side tiered diffraction pattern portion, and a chromatic aberration can be corrected with respect to the first laser light L1 by the outer circular side tiered diffraction pattern portion. Additionally, the design of the chromatic aberration correction element can be led to facilitation of manufacture.

Embodiment 1

Figure 7:
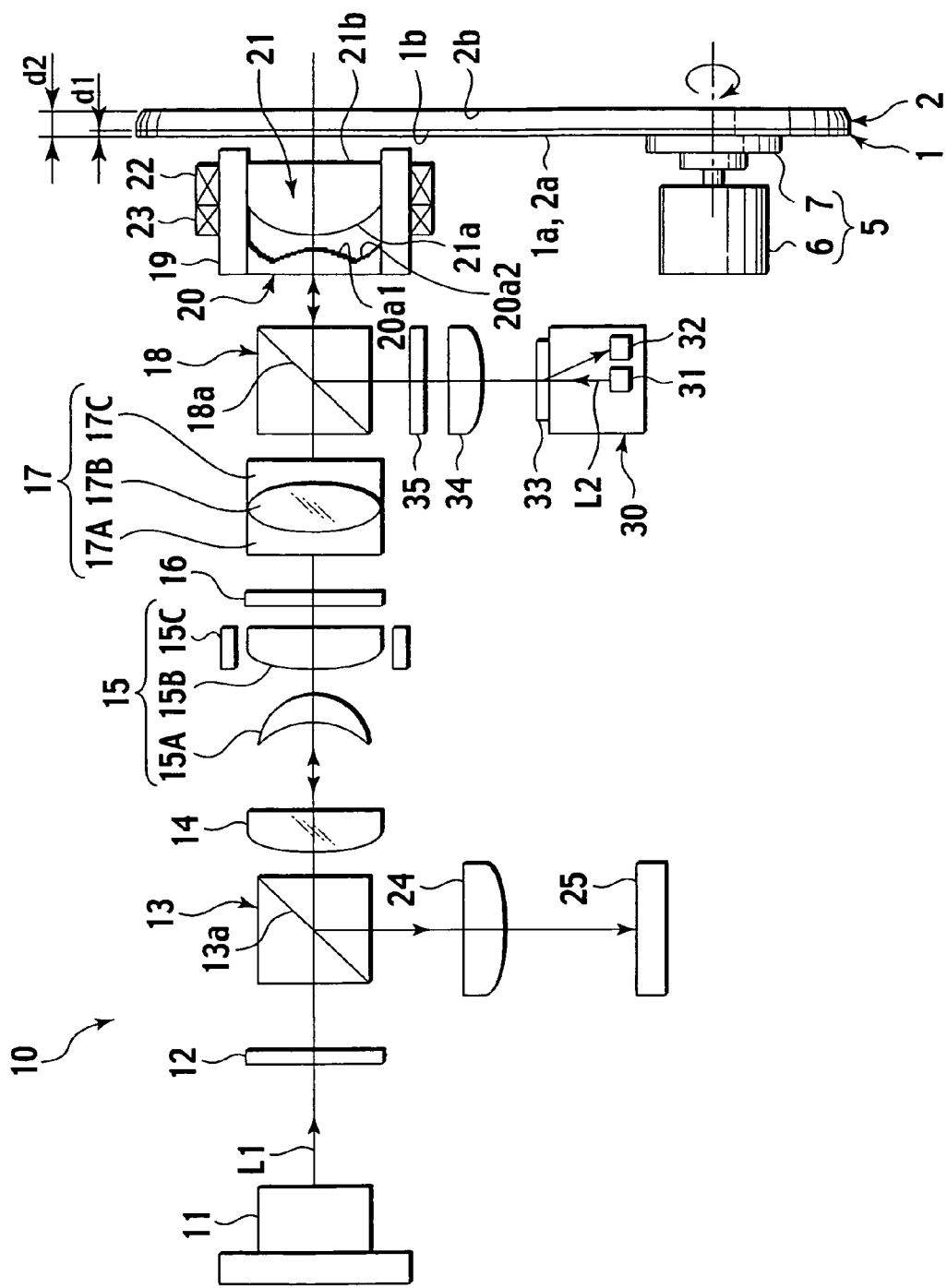
FIG. 7 is a view showing an entire structure of an optical pickup device according to Embodiment 1 of the present invention.

FIG. 7 is a diagram showing the whole constitution of an optical pickup device of Embodiment 1 according to the present invention.

As shown in FIG. 7, an optical pickup device 10 of Embodiment 1 according to the present invention was developed to enable selective application of a first optical recording medium 1 which records or reproduces an information signal at an extra-high density on or from a signal surface 1b with a small substrate:thickness by using a first laser light L1 whose reference wavelength λ1 is not more than 450 nm, a second optical recording medium 2 which records or reproduces an information signal at a high density on or from a signal surface 2b whose substrate thickness is larger than that of the signal surface 1b of the first optical recording medium 1 by using a second laser light L2 whose reference wavelength λ2 is approximately 650 nm longer than the reference wavelength λ1 of the first laser light L1, and a combined optical recording medium in which either of the first and second laser lights L1, L2 is incident upon a common laser beam incidence surface and the respective signal surfaces 1b, 2b of the first and second optical recording mediums 1, 2 are combined and integrally stacked.

It is to be noted that although not shown herein, a total disc substrate thickness of the combined optical recording medium in which the respective signal surfaces 1b, 2b of the first and second optical recording mediums 1, 2 are combined is set to approximately 1.2 mm. The first and second optical recording mediums 1 and 2 will be individually described hereinafter in detail. Since the combined optical recording medium is an application, the description is omitted.

Moreover, in the following description, an application to a disc-shaped optical disc as the first and second optical recording mediums 1, 2 will be described, but the present invention is not limited to this, and may also be applied to a card-shaped optical recording medium.

Moreover, the first and second optical recording mediums 1, 2 are selectively attached onto a turntable 7 secured to a shaft of a spindle motor 11 rotatably disposed in the optical disc driving apparatus 5.

Here, in the Blu-ray Disc 1 which is the first optical recording medium, a disc substrate thickness d1 between a laser beam incidence surface 1a and the signal surface 1b is set to be thin in a range of approximately 0.05 mm to 0.15 mm based on next-generation optical disc standards. A reinforcing plate (not shown) is bonded onto the surface so that a total thickness is set to be large, and the total thickness is, for example, approximately 1.2 mm. It is to be noted that in the following description, the first optical recording medium is represented by the Blu-ray Disc 1.

Moreover, in a DVD (Digital Versatile Disc) 2 which is the second optical recording medium, a disc substrate thickness d2 between a laser beam incidence surface 2a and the signal surface 2b is set to 0.6 mm, which is larger than the thickness of the Blu-ray Disc 1, based on DVD standards. A reinforcing plate (not shown) is bonded onto the surface so that the total thickness is, for example, approximately 1.2 mm. It is to be noted that in the following description, the second optical recording medium is represented by the DVD 2.

It is to be noted that in this Embodiment 1, the respective disc substrate thicknesses d1, d2 of the Blu-ray Disc 1 and the DVD 2 are set, for example, to 0.1 mm and 0.6 mm, respectively.

Moreover, the optical pickup device 10 of Embodiment 1 according to the present invention is disposed movably in a diametric direction of the Blu-ray disc 1 or the DVD 2 below the laser beam incidence surface 1a of the Blu-ray disc 1 or the laser beam incidence surface 2a of the DVD 2.

In the optical pickup device 10 of Embodiment 1 according to the present invention, a first laser light source (hereinafter referred to as the blue semiconductor laser) 11 which emits a first laser light L1 having a reference wavelength $\lambda 1$ of 450 nm or less for the Blu-ray Disc 1, and a second laser light source (hereinafter referred to as the red semiconductor laser) 31 in a DVD integrated device 30 which emits a second laser light L2 having a reference wavelength $\lambda 2$ of around 650 nm for the DVD 2 are disposed.

It is to be noted that, in this Embodiment 1, the reference wavelength $\lambda 1$ of the first laser light L1 emitted from the blue semiconductor laser 11 is set, for example, to 408 nm. On the other hand, it is assumed that the reference wavelength $\lambda 2$ of the second laser light L2 emitted from the red semiconductor laser 31 is set, for example, to 655 nm.

First, a blue semiconductor laser 11 side for the Blu-ray Disc 1 will be described. The first laser light L1 emitted from the blue semiconductor laser 11 is a divergent light of linear polarization. This divergent light enters a diffraction grating 12, and divided into three beams (which will be referred to as three beams hereinafter) comprising a 0-order diffraction light and $\pm 1^{st}$ order diffraction lights in accordance with a pitch and an inclination angle of irregular gratings (not shown) formed in this diffraction grating 12. Then, the three beams enter a polarized beam splitter 13.

It is to be noted that although the three beams are generated by the diffraction grating 12 in this Embodiment 1, a structure having no diffraction grating 12 is also possible. In this case, it is good enough to allow the first laser light L1 emitted from the blue semiconductor laser 11 to directly enter the polarized beam splitter 13 as one beam.

The polarized beam splitter 13 has a transmission/reflection dielectric multilayered film 13a having the polarizability formed thereto in order to transmit the three beams from the diffraction grating 12 therethrough and reflect a later-described reflected light from the Blu-ray Disc 1 thereon so that a direction of the light is changed by substantially 90°.

Thereafter, the three beams obtained from the first laser light L1 transmitted through the transmission/reflection dielectric multilayered film 13a in the polarized beam splitter 13 are converted into a parallel light by a collimator lens 14 to enter spherical aberration correcting means 15.

The spherical aberration correcting means 15 corrects a spherical aberration generated by an optical system arranged between the blue semiconductor laser 11 and the single surface 1b of the Blu-ray Disc 1 with irregularities in the disc substrate thickness d1 of the Blu-ray Disc 1 or a wavelength error of the first laser light L1 emitted from the blue semiconductor laser 11, and comprises a concave lens (a negative lens) 15A provided on the blue semiconductor laser 11 side, a convex lens (a positive lens) 15B provided on a later-described objective lens 21 side and an actuator 15C which displaces the convex lens 15B along a direction of an optical axis. Additionally, the actuator 15C is used to displace the convex lens 15B in the direction of the optical axis with respect to the concave lens 15A so that a gap between the concave lens 15A and the convex lens 15B is controlled, the parallelism of the three beams entering the objective lens 21 is adjusted, and a spherical aberration due to a magnification error of the objective lens 21 is generated to be canceled out with any other spherical aberration, thereby performing a correction so that the spherical aberration becomes zero. It is to be noted that a method which displaces the concave lens (a negative lens) 15A in the direction of the optical axis with respect to the convex lens 15B may be adopted.

It is to be noted that although the combination of the concave lens 15A, the convex lens 15B and the actuator 15C is used as the spherical aberration correcting means in this Embodiment 1, a wavefront modulation element using a liquid crystal element or the like may be applied instead.

Thereafter, when the three beams obtained from the first laser light L1 transmitted through the spherical aberration correcting means 15 pass through a wavelength plate 16, the three beams obtained from the first laser light L1 are converted into a circularly polarized light by giving a phase difference of a substantially ¼ wavelength (90°) to polarization components corresponding to a phase advancing axis and a phase delaying axis of the wavelength plate, and then the converted light enters the chromatic aberration correction element 17. Alternatively, this ¼ wave plate can be placed at a position closer to the objective lens 21. In such a case, it is possible to use a wave plate which gives a phase difference of a ¼ wavelength to both of the first and second laser lights L1 and L2. Further, it is also possible to use a wave plate configured not to function as a phase plate with respect to the second laser light L2.

The chromatic aberration correction element 17 is formed by attaching a concave lens 17A having one surface formed into a flat face and the other surface formed into a concave spherical surface, a convex lens 17B having both surfaces formed into convex spherical surfaces, and a concave lens 17C having one surface formed into a concave spherical surface and the other surface formed into a flat surface, and has a function which corrects a chromatic aberration with respect to the first-laser light L1.

Figure 6:
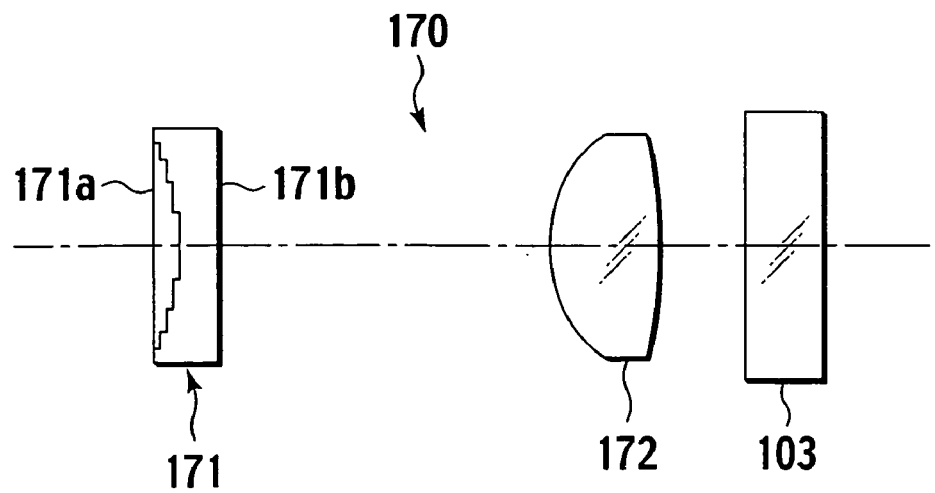
FIG. 6 is a view schematically showing an optical system of an optical pickup device according to Conventional Example 6.

It is to be noted that the chromatic aberration correction element 17 is used in this Embodiment 1, but it is possible to apply instead a diffraction type chromatic aberration correction element which has a flat surface vertical to an optical axis formed into a tiered shape as a concentric circular zone on at least one of the light incidence end surface and the light projection end surface described in Conventional Example 6 with reference to FIG. 6. Further, this concentric circular zone may be formed on a refraction surface (a curved surface).

It is to be noted that since a chromatic aberration is not generated if the reference wavelength $\lambda 1$ of the first laser light L1 is 408 nm, it is good enough to measure a chromatic aberration with respect to the Blu-ray Disc 1 by using the blue semiconductor laser 11 in which the first laser light L1 has a wavelength of, e.g., 411 nm.

Furthermore, the three beams obtained from the first laser light L1 transmitted through the chromatic aberration correction element 17 pass through a dichroic prism 18 which serves as first and second laser light separating means. This dichroic prism 18 has a transmission/reflection dichroic film 18a having the wavelength selectivity formed thereto in order to transmit the first laser light L1 exiting from the blue semiconductor laser 11 therethrough and, on the other hand, reflect the second laser light L2 exiting from the red semiconductor laser 31 thereon so that a direction of the light is changed by substantially 90°.

Then, the three beams obtained from the first laser light L1 transmitted through the transmission/reflection dichroic film 18a in the dichroic prism 18 advance straight as the parallel beam in a diffractive optical element 20 of Embodiment 1 according to the present invention attached at a lower part in the lens holder 19 and enter the objective lens 21 attached at an upper part in the lens holder 19. The first laser beam (three beams) narrowed down by this objective lens 21 is incident on the laser incidence surface 1a of the Blu-ray Disc 1 and condensed on the signal surface 1b.

In this example, the diffractive optical element 20 of Embodiment 1 according to the present invention is disposed at the lower part in the lens holder 19 with its optical axis matching with that of the objective lens 21 in a state that an inner circular side irregular diffraction pattern portion 20 having an irregular shape is formed in a circular shape in an inner circular area on the upper surface (one surface) side facing the objective lens 21 based on a first phase function curve obtained by using a later-described phase function and an outer circular side tiered diffraction pattern portion 20a2 having a tiered shape is formed in a circular shape in an outer circular area outside the inner circular side irregular diffraction pattern portion 20a1 based on a second phase function curve obtained by using a later-described second phase function. Furthermore, the first laser light L1 exiting from the blue semiconductor laser 11 is transmitted through the inner circular side irregular diffraction pattern portion 20a1 and the outer circular side tiered diffraction pattern portion 20a2 of the diffractive optical element 20 as the parallel light, and then the first laser light L1 is allowed to enter the objective lens 21.

It is to be noted that the diffractive optical element 20 constitutes a primary part of Embodiment 1, and a shape of the diffractive optical element 20 and an operation with respect to the first laser light L1 by the diffractive optical element 20 will be described later.

Moreover, a numerical aperture of the objective lens 21 is set to 0.75 or more for the Blu-ray Disc, and at least one of first and second surfaces 21a, 21b facing each other is formed in an aspherical surface. In this Embodiment 1, a single lens which has a numerical aperture (NA) of 0.85 and aplanatic characteristics or characteristics close to the aplanat is used. It is to be noted that the aplanat means a lens which completely corrects a spherical aberration on the axis and satisfies sine conditions (conditions under which a coma aberration is not generated outside the axis).

Additionally, a focus coil 22 and a tracking coil 23 are integrally attached to an outer periphery of the lens holder 19, and the diffractive optical element 20 and the objective lens 21 are controlled integrally with the lens holder 19 in the focus direction and the tracking direction of the Blu-ray Disc 1 through a plurality of non-illustrated suspension wires secured to an outer periphery of the lens holder 19.

It is to be noted that, in case of the DVD 2 which will be described later, the diffractive optical element 20 and the objective lens 21 are likewise controlled integrally with the lens holder 19 in the focus direction and the tracking direction of the DVD 2.

Then, the first laser beam (three beams) converged by the objective lens 21 is caused to enter from the laser beam incidence surface 1a of the Blu-ray Disc 1 to be condensed on the signal surface 1b, thereby performing reproducing, recording or deleting with respect to the signal surface 1b by the first laser beam.

Furthermore, a returning first reflected light by the first laser light L1 reflected by the signal surface 1b of the Blu-ray Disc 1 again enters the objective lens 21 in the reverse direction, passes through the diffractive optical element 20, the dichroic prism 18, the chromatic aberration correction element 17, the wavelength plate 16, the spherical aberration correcting means 15 and the collimator lens 14 in the mentioned order, and is reflected by the transmission/reflection dielectric multilayered film 13a having the polarizability in the polarized beam splitter 13 so that a direction of the returning first reflected light is changed by approximately 90°. Thereafter, this light is condensed on a first photodetector 25 through a cylindrical lens 24. Moreover, the first photodetector 25 detects a tracking error signal, a focus error signal and a main data signal obtained when reproducing information on the signal surface 1b of the Blu-ray Disc 1.

Next, a red semiconductor laser 31 side for the DVD 2 will be described. There is adopted an optical system which does not use the spherical aberration correcting means 15 and the chromatic aberration correcting means 17, which are utilized when recording or reproducing information to or from the Blu-ray Disc 1, in case of recording or reproducing information to or from the DVD 2.

It is to be noted that the spherical aberration correcting means 15 and the chromatic aberration correcting means 17 are arranged in the optical system only which records or reproduces information to or from the Blu-ray Disc 1, but the present invention is not restricted thereto, and it is possible to employ the optical system including the both means 15 and 17 even in case of recording or reproducing information to or from the DVD 2. In this case, the spherical aberration correcting means 15 may be configured so that an aberration can be reduced with respect to the second laser light L2, or an aberration can be reduced by appropriately setting the parallelism of the second laser light L2 which enters the spherical aberration correcting means 15 and the chromatic aberration correcting means 17.

Here, in the integrated device 30 for the DVD, the red semiconductor laser 31 and a second photodetector 32 disposed on the right side of the red semiconductor laser 31 are integrated on the non-illustrated semiconductor substrate, and a hologram element 33 is disposed above the red semiconductor laser 31.

It is to be noted that the integrated device 30 for the DVD is used in this Embodiment 1, but the present invention is not restricted thereto, and a configuration in which the second laser light from the red semiconductor laser is divided by the beam splitter may be adopted although not shown.

In this example, the second laser light L2 exiting from the red semiconductor laser 31 is a divergent light of linear polarization, and this divergent light passes through the hologram element 33. Then, the second laser light L2 transmitted through the hologram element 33 is converted into a parallel light by the collimator lens 34, and this parallel light is transmitted through a phase plate 35 for the second laser light to be turned into a circularly polarized light. At this moment, when the second laser light L2 is transmitted through the phase plate 35 for the second laser light, this phase plate 35 converts the second laser light L2 into the circularly polarized light by giving a phase difference of approximately ($\lambda$2)/4 between its phase advancing axis and phase delaying axis.

Additionally, the parallel light obtained from the second laser light L2 transmitted through the phase plate 35 is reflected on a transmission/reflection dichroic film 18a having the wavelength selectivity in a dichroic prism 18 so that its ray direction is changed by substantially 90°. Thereafter, an aperture is restricted with respect to the second laser light L2 by the diffractive optical element 20 so that a numerical aperture (NA) into the objective lens 21 is 0.6. Further, the parallel light obtained from the second laser light L2 is diffracted by the inner circular side irregular diffraction pattern portion 20a1 of the diffractive optical element 20, and the diffracted light obtained from the second laser light L2 is caused to enter the objective lens 21 while correcting a spherical aberration.

It is to be noted that an operation of the diffractive optical element 20 with respect to the second laser light L2 will be described later.

Specifications of the main optical system in Embodiment 1 will now be described in order.

First, the specification of the objective lens 21 is shown in Table 1.

TABLE 1

| | |
|---|---|
| Designed wavelength (λ1) | 408 nm |
| Numerical aperture (NA) | 0.85 |
| Focal distance | 2.0 mm |
| Incidence pupil diameter | 3.4 mm |
| Magnification | 0 time (parallel light) |

Table 2 shows a list of respective optical surface forming members including the chromatic aberration correction element 17, the diffractive optical element 20, the objective lens 21, the Blu-ray Disc 1 and the DVD 2.

TABLE 2

| Surface number | Optical surface forming member | Surface shape | Radius [mm] | Thickness [mm] | Material | Korenich constant |
|---|---|---|---|---|---|---|
| Object point | | | | −3200 (∞) | | |
| 1 | Chromatic aberration correction element | | ∞ | 0.7 | S-TIH11 | |
| 2 | | Spherical surface | 3.25(∞) | 2.0 | S-LAH53 | |
| 3 | | Spherical surface | −3.25 (∞) | 0.7 | S-TIH11 | |
| 4 | | | ∞ | 5.0 | | |
| 5 | Diffractive optical element | | ∞ | 1.0 | BK7 | |
| 6 | | Phase surface | | 2.0 | | |
| 7 | Objective lens | Aspherical surface | 1.56 | 2.0 | NBFD13 | −1.066917 |
| 8 | | Aspherical surface | 9.109017 | 0.768395 (0.665046) | | −1.930058 |
| 9 | Blu-ray Disc (DVD) | | ∞ | 0.1(0.6) | polycarbonate | |
| Image surface | | | | | | |

Thereafter, the second laser beam converged by the objective lens 21 is allowed to enter from the laser beam incidence surface 2a of the DVD 2 so that it is condensed on the signal surface 2b, thereby performing reproducing, recording or deleting on the signal surface 2b of the DVD 2 by the second laser beam.

Moreover, a returning second reflected light obtained by the second laser beam reflected on the signal surface 2b of the DVD 2 again enters the objective lens 21 in the reverse direction, and is reflected by the transmission/refection dichroic film 18a in the dichroic prism 18 through the diffractive optical element 20 so that its ray direction is changed by approximately 90°. Then, the returning second reflected light passes through the phase plate 35 for the second laser light and the collimator lens 34 in the mentioned order, is diffracted by the hologram element 33, and condensed on the second photodetector 32. Additionally, the second photodetector 32 detects a tracking error signal, a focus error signal and a main data signal obtained when reproducing information on the signal surface 2b of the DVD 2.

In the table, numerical values in parentheses are values corresponding to the DVD.

Further, the following Table 3 shows each refractive index with respect to each wavelength of each material used for the chromatic aberration correction element, the diffractive optical element, the objective lens, the Blu-ray Disc and the DVD depicted in Table 2.

TABLE 3

| | Refractive index with respect to each wavelength | | |
|---|---|---|---|
| Material | 408 nm | 411 nm | 655 nm |
| S-TIH11 | 1.84027885 | 1.83845184 | — |
| S-LAH53 | 1.83962087 | 1.83860927 | — |
| BK7 | 1.52981667 | 1.52944626 | 1.51436212 |
| NBFD13 | 1.83965422 | 1.83864573 | 1.80031160 |
| polycarbonate | 1.62109862 | 1.61992846 | 1.57995043 |

Next, the following Expression (1) shows a first phase function Φ(h) used when manufacturing the sixth surface (the inner circular side irregular diffraction pattern portion 20a of the diffractive optical element 20) in Table 2.

$$\Phi(h) = A_2 h^2 + A_4 h^4 + A_6 h^6 + A_8 h^8 \quad (1)$$

where Φ(h) is a phase function (its unit is radian);
$A_2$ to $A_8$ are phase function coefficients of second to eighth orders; and
h is a height from the optical axis of the diffractive optical element 20.

Furthermore, the following Table 4 shows an example of the phase function coefficients $A_2$ to $A_8$ in the first phase function Φ(h) mentioned above.

TABLE 4

| | |
|---|---|
| $A_2$ | 150 |
| $A_4$ | −3.117866 |
| $A_6$ | 2.2550178 |
| $A_8$ | −1.1992165 |

Next, the following Expression (2) shows a second phase function Φ'(h) used when manufacturing the sixth surface (the outer circular side tiered diffraction pattern portion 20a2 of the diffractive optical element 20) in Table 2.

$$\Phi'(h) = A'_2 h^2 + A'_4 h^4 + A'_6 h^6 + A'_8 h^8 \quad (2)$$

where Φ'(h) is a phase function (its unit is radian);
$A'_2$ to $A'_8$ are phase function coefficients of second to eighth orders; and
h is a height from the optical axis of the diffractive optical element 20.

Furthermore, the following Table 5 shows an example of the phase function coefficients $A'_2$ to $A'_8$ in the second phase function Φ'(h) mentioned above.

TABLE 5

| | |
|---|---|
| $A'_2$ | 50.609469 |
| $A'_4$ | −18.322281 |
| $A'_6$ | −3.78978 |
| $A'_8$ | −2.35897 |

Next, when the seventh surface (the surface 21a facing the diffractive optical element 20 in the objective lens 21) in Table 2 on the laser light source side and the eighth surface (21b) in Table 2 which is the surface facing the Blu-ray Disc 1 or the DVD 2 in the objective lens 21 are formed in the aspherical surface, the aspherical surface is represented by the following Expression (3) which is an aspherical surface polynomial equation:

$$Z = \frac{Ch^2}{1 + \sqrt{1 - (1+K)C^2 h^2}} + B_4 h^4 + B_6 h^6 + B_8 h^8 + B_{10} h^{10} + B_{12} h^{12} + B_{14} h^{14} + B_{16} h^{16} \quad (3)$$

where Z is a distance from a vertex of the surface 21a or the surface 21b of the objective lens 21;
C is a curvature (1/curvature radius) of the surface 21a or the surface 21b;
h is a height from the optical axis of the objective lens 21;
K is a Korenich constant; and
$B_4$ to $B_{16}$ are aspherical surface coefficients of fourth to sixteenth orders.

When the aspherical surface polynomial equation of the above Expression (3) is used, the examples of the aspherical surface coefficients $B_4$ to $B_{16}$ for forming the surface 21a (the seventh surface) of the objective lens 21 in the aspherical surface are shown in Table 6.

TABLE 6

| | |
|---|---|
| $B_4$ | 0.022731915 |
| $B_6$ | 0.0039137076 |
| $B_8$ | −0.0024774758 |
| $B_{10}$ | 0.0029912213 |
| $B_{12}$ | −0.0016943958 |
| $B_{14}$ | 0.00051074989 |
| $B_{16}$ | −6.7127978 × E$^{-5}$ |

Moreover, when the aspherical surface polynomial equation of the above Expression (3) is used, the examples of the aspherical surface coefficients $B_4$ to $B_{10}$ for forming the surface 21b (the eighth surface) of the objective lens 21 in the aspherical surface are shown in Table 7.

TABLE 7

| | |
|---|---|
| $B_4$ | 0.054346144 |
| $B_6$ | −0.054980013 |
| $B_8$ | 0.017860586 |
| $B_{10}$ | −0.0024994739 |

Each optical surface forming member shown in Table 2 will now be described hereinafter with reference to FIG. 7 mentioned above and FIGS. 8 to 17.

Figure 8A:
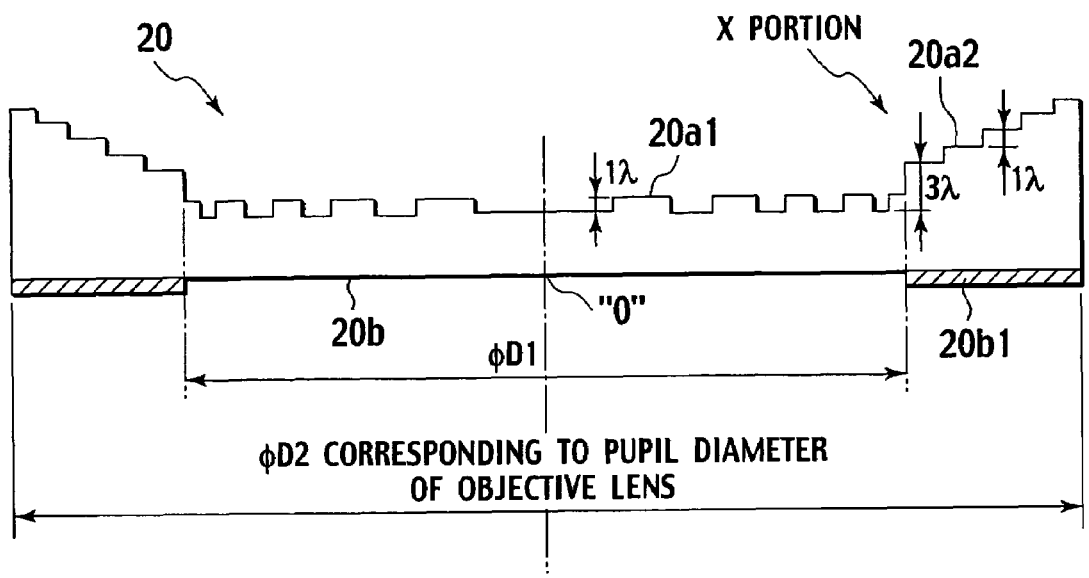
FIGS. 8A and 8B are a general view and an enlarged view of an X portion illustrating a diffractive optical element according to Embodiment 1 of the present invention.
Figure 8B:
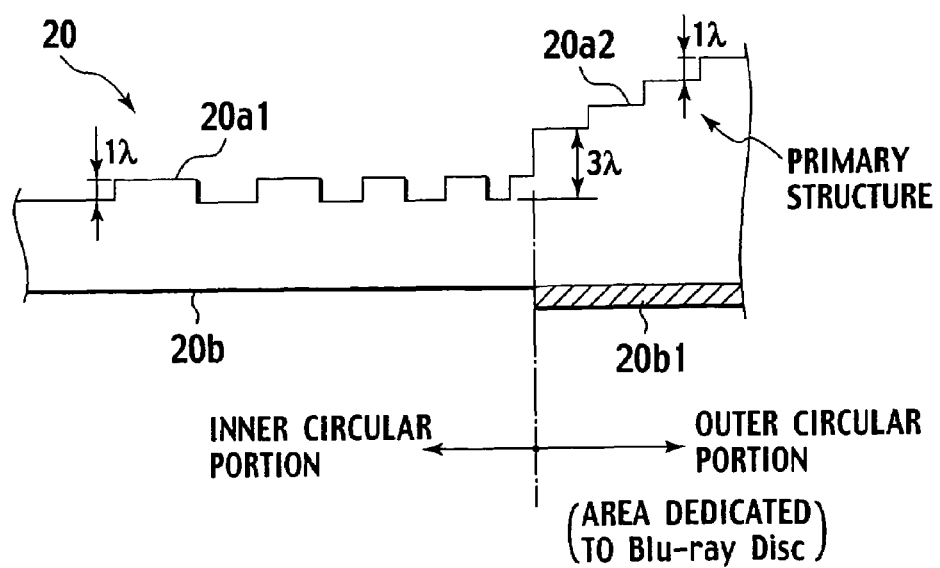
Figure 9:
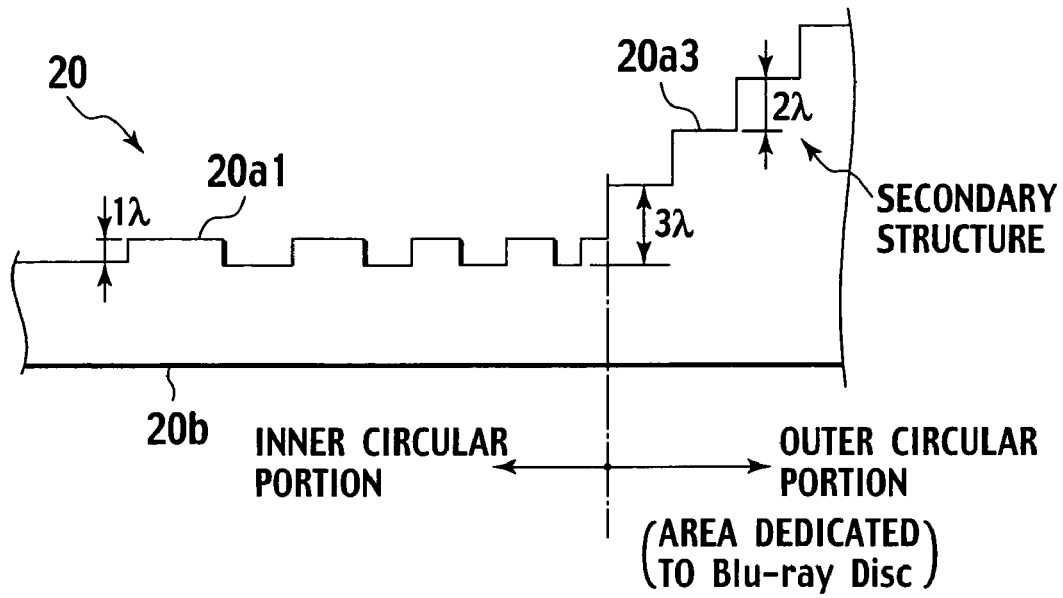
FIG. 9 is a view showing Modification 1 obtained by partially modifying the diffractive optical element according to Embodiment 1 of the present invention.
Figure 10:
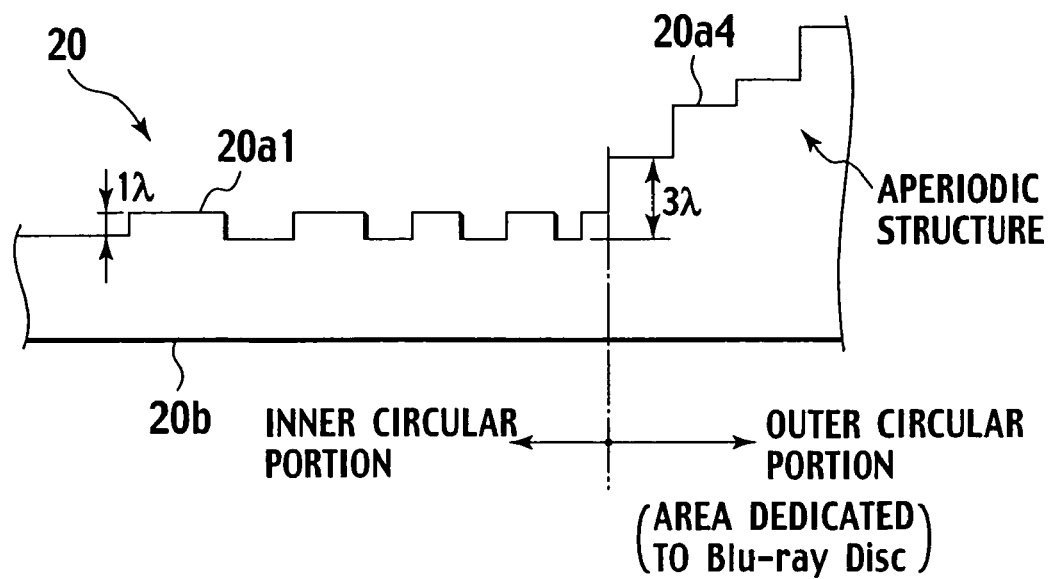
FIG. 10 is a view showing Modification 2 obtained by partially modifying the diffractive optical element according to Embodiment 1 of the present invention.
Figure 11:
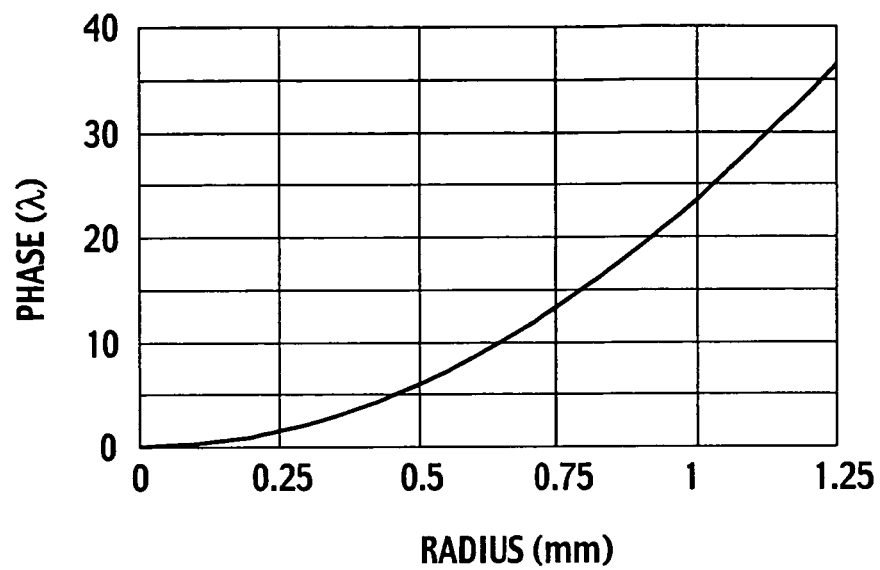
FIG. 11 is a view illustrating an inner circular side phase function curve (a first phase function curve) obtained based on a first phase function $\Phi(h)$ which is used when manufacturing an inner circular side irregular diffraction pattern portion of the diffractive optical element in Embodiment 1.
Figure 12:
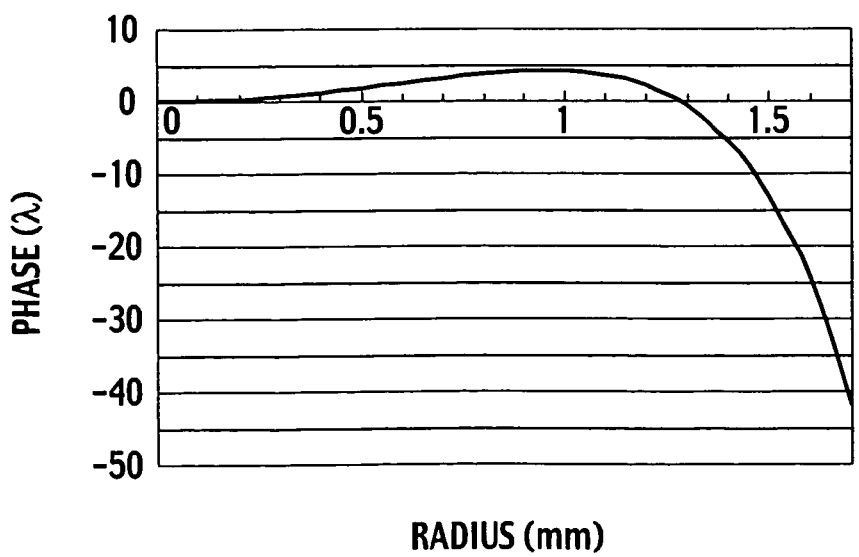
FIG. 12 is a view illustrating an outer circular side phase function curve (a second phase function curve) obtained based on a second phase function $\Phi'(h)$ which is used when manufacturing an outer circular side irregular diffraction pattern portion of the diffractive optical element in Embodiment 2.
Figure 13:
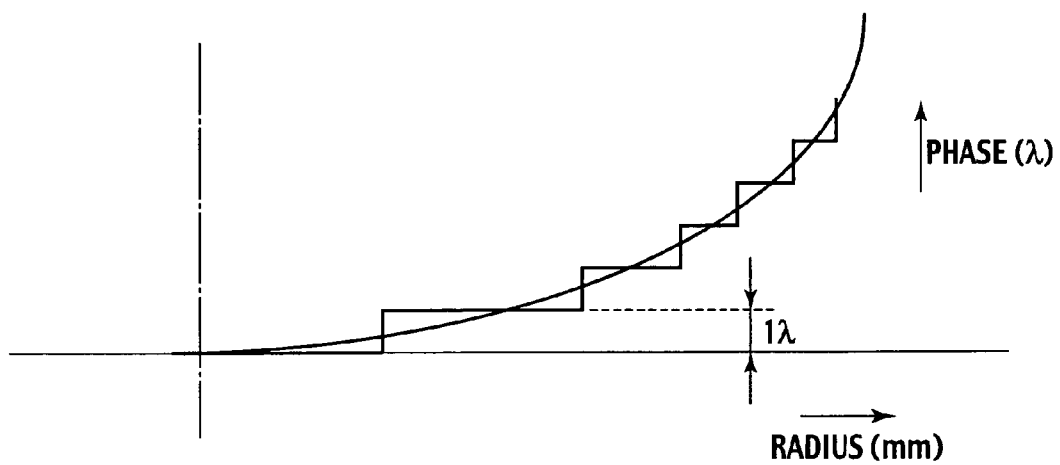
FIG. 13 is a view showing an example where the outer circular side tiered diffraction pattern portion of the diffractive optical element is sectionalized in a tier shape by approximately $1\lambda$ based on the outer circular side phase function curve acquired in FIG. 12.
Figure 14:
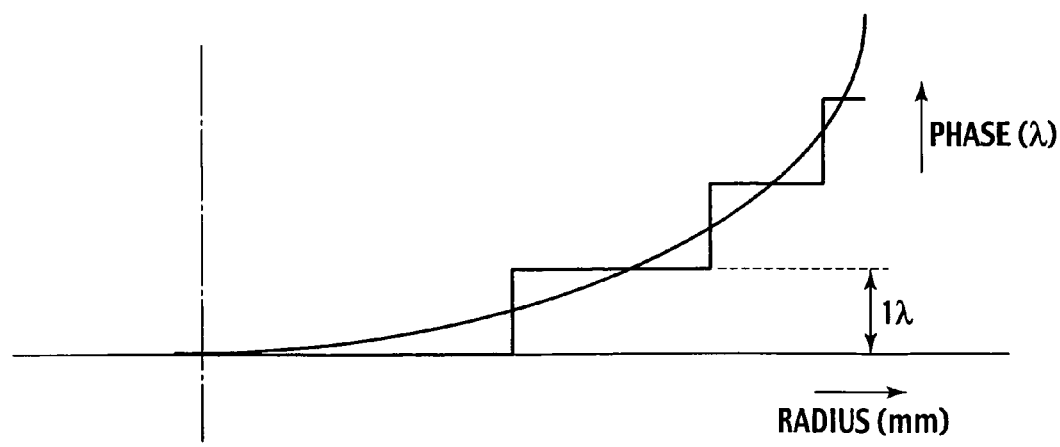
FIG. 14 is a view showing an example where the outer circular side tiered diffraction pattern portion is sectionalized in a tier shape by approximately $2\lambda$ based on the outer circular side phase function curve acquired in FIG. 12.
Figure 15:
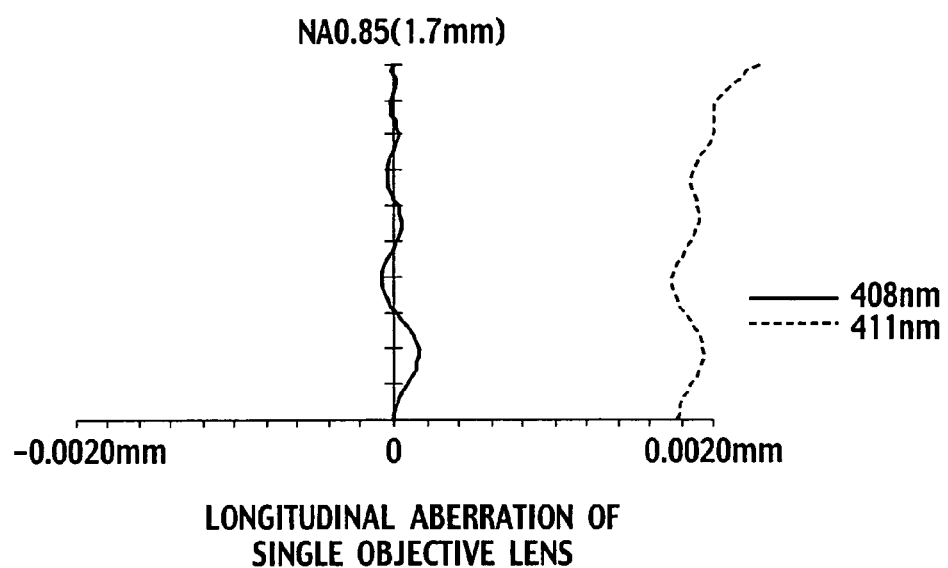
FIG. 15 is a longitudinal aberration view of a single objective lens in Embodiment 1.
Figure 16:
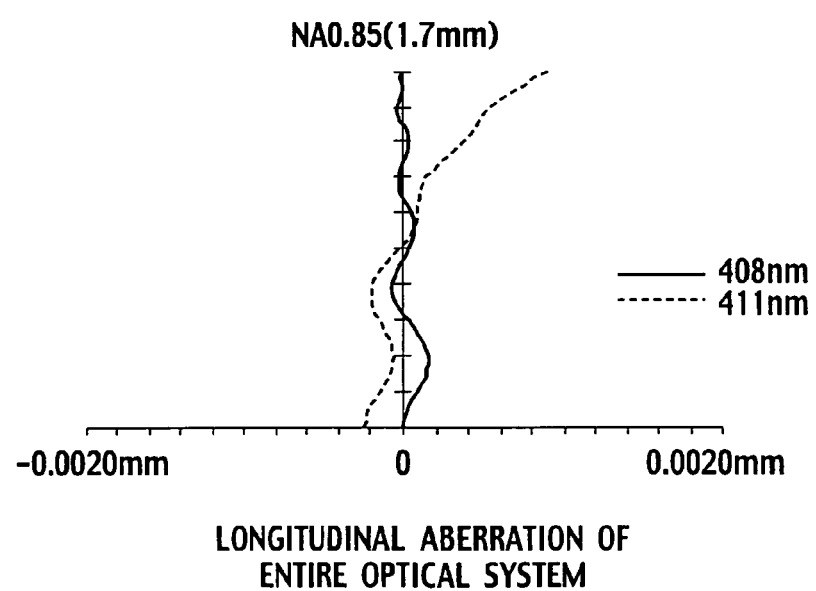
FIG. 16 is a longitudinal aberration view of an entire optical system in Embodiment 1.
Figure 17:
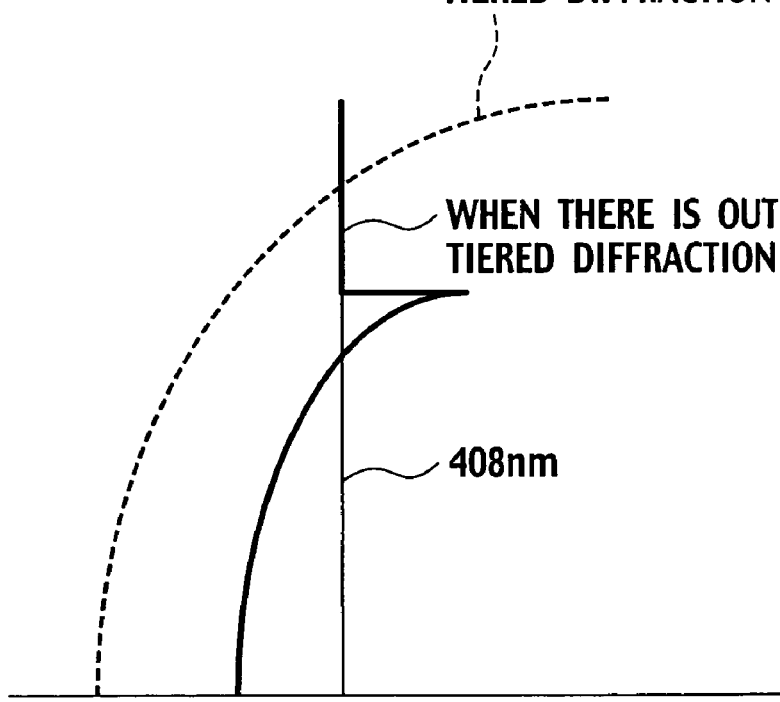
FIG. 17 is a view illustrating an optimum setting method for a longitudinal aberration in Embodiment 1.

FIGS. 8A and 8B are a general view and an enlarged view of an X portion illustrating the diffractive optical element of Embodiment 1 according to the present invention. FIG. 9 is a view showing Modification 1 obtained by partially modifying the diffractive optical element of Embodiment 1 according to the present invention. FIG. 10 is a view showing Modification 2 obtained by partially modifying the diffractive optical element of Embodiment 1 according to the present invention. FIG. 11 is a view illustrating an inner circular side phase function curve (a first phase function curve) obtained based on the first phase function Φ(h) which is used when manufacturing an inner circular side irregular diffraction pattern portion of the diffractive optical element in Embodiment 1. FIG. 12 is a view illustrating an outer circular side phase function curve (a second phase function curve) obtained based on the second phase function Φ'(h) which is used when manufacturing an outer circular side tiered diffraction pattern portion of the diffractive optical element in Embodiment 1. FIG. 13 is a view showing an example where the outer circular side tiered diffraction pattern portion of the diffractive optical element is sectionalized in a tiered shape by approximately 1λ based on the outer circular side phase function curve acquired in FIG. 12. FIG. 14 is a view showing an example where the outer circular side tiered diffraction pattern portion of the diffractive optical element is sectionalized in a tiered shape by approximately 2λ based on the outer circular side phase function curve acquired in FIG. 12. FIG. 15 is a longitudinal aberration view of the single objective lens in Embodiment 1. FIG. 16 is a longitudinal aberration view of the entire optical system in Embodiment 1. FIG. 17 is a view illustrating an optimum setting method for a longitudinal aberration.

First, the chromatic aberration correction element 17 is arranged in the optical system only which records or reproduces information to or from the Blu-ray Disc 1, and has a function which corrects a chromatic aberration with respect to the first laser light L1 for the Blu-ray Disc. When forming the chromatic aberration correction element 17 by attaching the concave lens 17A, the convex lens 17B and the concave lens 17C, as shown in Table 2, the attached surfaces of the concave lens 17A and the convex lens 17B are set to a radius 3.25 mm of a spherical surface, and the attached surfaces of the convex lens 17B and the concave lens 17C are set to a radius −3.25 mm of a spherical surface. In this example, S-TIH11 (optical glass manufactured by OHARA) is used for the concave lens 17A and the concave lens 17C, and S-LAH53 (optical glass manufactured by OHARA) is used for the convex lens 17B.

Next, as shown in FIGS. 8A and 8B, the diffractive optical element 20 which is a primary part of Embodiment 1 includes a function which corrects a spherical aberration generated due to a difference in substrate thickness between the Blu-ray Disc 1 and the DVD 2.

The diffractive optical element 20 is integrally formed by using transparent BK7 (borosilicate crown glass . . . optical glass manufactured by HOYA) having the optical transparency, a quartz substrate or a transparent resin, and BK7 is used in this Embodiment 1 as shown in Table 2.

Additionally, in the diffractive optical element 20, the inner circular side irregular diffraction pattern portion 20a1 is formed in an annular shape (a ring shape) within a predetermined inner circular portion diameter φD1 for the correction of a spherical aberration generated due to a difference in substrate thickness between the Blu-ray Disc 1 and the DVD 2 while centering on the central point "0" through which the optical axis runs on the upper surface (one surface) side facing the objective lens 21 (FIG. 7), and the outer circular side tiered diffraction pattern portion 20a2 is formed in an annular shape (a ring shape) within at least a predetermined outer circular portion diameter φD2 outside this inner circular side irregular diffraction pattern portion 20a1. Therefore, a spherical aberration can be corrected with respect to the second laser light L2 for the DVD by the inner circular side irregular diffraction pattern 20a1, and a chromatic aberration can be corrected with respect to the first laser light L1 for the Blu-ray Disc by the outer circular side tiered diffraction pattern portion 20a2. In this example, the predetermined inner circular portion diameter φD1 with which the inner circular side irregular diffraction pattern portion 20a1 is formed is set to φ2.5 mm, whilst the predetermined outer circular portion diameter φD2 with which the outer circular side tiered diffraction pattern portion 20a2 is formed is set to φ3.4 mm, and a pupil diameter of the objective lens 21 (FIG. 7) is φ3.4 mm as shown in Table 1. Therefore, the entire surface of this pupil diameter can be covered.

Giving a more concrete description, first, as to the inner circular side irregular diffraction pattern portion 20a1 formed in the inner circular area of the diffractive optical element 20, a wavelength having the same value (408 nm) as the reference wavelength λ1 of the first laser light L1 is determined as the designed wavelength λ, the phase function coefficients $A_2$ to $A_8$ of the second to eighth orders shown in Table 4 are substituted in the first phase function Φ(h) shown in Expression (1) in order to obtain the inner circular side function curve (the first phase function curve) shown in FIG. 11, and the inner circular side irregular diffraction pattern portion 20a1 is formed based on a curve having a radius equal to or smaller than 1.25 mm in the inner circular side phase function curve. In the inner circular side irregular diffraction pattern portion 20a1, a height of a convex portion is set to approximately 1λ-fold of the designed wavelength λ with respect to a concave portion, and a plurality of irregular portions are repeatedly formed in an annular shape (a ring shape) in accordance with the inner circular side phase function curve (the first phase function curve) while gradually changing a pitch in the radial direction toward the outer circular side.

In this example, a unit of the first phase function Φ(h) used when forming the inner circular side irregular diffraction pattern portion 20a1 is radian. As shown in FIG. 11, when a horizontal axis represents a radius (mm) equivalent to a height h from the optical axis of the diffractive optical element 20 and a vertical axis represents a phase (λ) with 2π radian being determined as one wavelength (1λ) with respect to the inner circular side phase function curve (the first phase function curve) obtained based on the first phase function Φ(h), a distance between points where each line of 1λ, 2λ, 3λ . . . crosses the inner circular side phase function curve is a pitch of the irregular portions in the radial direction in order to obtain the inner circular side irregular diffraction pattern portion 20a1 in which a height of the convex portion is set to approximately 1λ with respect to the concave portion as will be described later with reference to FIG. 13.

Based on this, since the height of the convex portion is approximately 1λ with respect to the concave portion, the inner circular side irregular diffraction pattern portion 20a1 formed in the inner circular area of the diffractive optical element 20 allows transmission of 0-order optical diffraction light which does not act on the first laser light L1 for the Blu-ray Disc at all therethrough and, on the other hand, corrects a spherical aberration by using $1^{st}$ order diffraction light obtained by diffracting the second laser light L2 for the DVD.

Next, as to the outer circular side tiered diffraction pattern portion 20a2 formed in the outer circular area of the diffractive optical element 20, a wavelength having the same value (408 nm) as the reference wavelength λ1 of the first laser light L1 is determined as the designed wavelength λ, the phase function coefficients $A'_2$ to $A'_8$ of the second to eighth orders shown in Table 5 are substituted in the second phase function Φ'(h) shown in Expression (2) in order to obtain the outer circular side phase function curve (the second phase function curve) shown in FIG. 12, and the outer circular side tiered diffraction pattern portion 20a2 is formed based on a curve having a radius equal to or above 1.25 mm in the outer circular side phase function curve. A tier height of a plurality of tiers formed toward the central point "0" side is set to approximately mλ-fold (where m is a natural number which does not include 0) of the designed wavelength λ, and the outer circular side tiered diffraction pattern portion 20a2 has the tiers ascending toward a higher position than the inner circular side irregular diffraction pattern portion 20a1 and is formed to the outer side of the outer circular portion diameter φD2.

In this example, the inner circular side irregular diffraction pattern portion 20a1 is connected with the outer circular side tiered diffraction pattern portion 20a2 while differentiating the height by, e.g., 3λ, and this will be described later.

Further, an actual shape of the outer circular side tiered diffraction pattern portion 20a2 of the diffractive optical element 20 takes a conformation of a discrete tiered shape with a phase width of approximately 2 mπ (which is an approximately integral multiple of the designed wavelength λ), where m is a natural number which does not include 0, in the second phase function Φ'(h). As a result, the tier height of the tiers is a height that a difference in optical path length is approximately m-fold of the designed wavelength λ (408 nm). Then, with the wavelength which is approximately mλ-fold of the designed wavelength λ, a wavefront does not substantially vary with respect to the first laser light L1 having the reference wavelength λ1 of 408 nm transmitted through the outer circular side tiered diffraction pattern portion 20a2 of the diffractive optical element. When the wavelength of the first laser light L1 is changed, a wavefront change is generated in accordance with a phase structure.

In this example, a unit of the second phase function $\Phi'(h)$ used when forming the outer circular side irregular diffraction pattern portion 20a2 is also radian. As shown in FIG. 12, in cases where a horizontal axis represents a radius (mm) equivalent to a height h from the optical axis of the diffractive optical element 20 and a vertical axis represents a phase (λ) with $2\pi$ radian being determined as one wavelength (1λ) with respect to the outer circular side phase function curve (the second phase function curve) obtained based on the second phase function $\Phi'(h)$, when a value of the continuous smooth outer circular side phase function curve is approximated to a discrete value, an error between these values (which can be a quantization error) is an error of the wavefront, and mainly becomes a diffraction loss. Specifically, although the light transmittance is reduced in some measure, a range of changes in wavelength is small in the vicinity of the reference wavelength λ1 of the first laser light L1 for to the Blu-ray Disc 1. Therefore, this reduction is small and does not practically become a problem. Furthermore, since a circular structure is very fine, an influence of the wavefront error on a spot formed by the objective lens 21 can be regarded as an aberration of a component of a higher order. Therefore, such an aberration is hardly produced and can be ignored.

In this example, when a value of m mentioned above is set to, e.g., 1, as shown in FIGS. 8A and 8B, the tier height of the tiers of the outer circular side tiered diffraction pattern portion 20a2 becomes approximately 1λ-fold of the designed wavelength λ. In this case, as shown in FIG. 13 in an enlarged manner, since the outer circular side tiered diffraction pattern portion 20a2 is sectionalized in a tiered shape so that the tier height of the tiers becomes approximately 1λ-fold of the designed wavelength λ with respect to the outer circular side phase function curve, the outer circular side tiered diffraction pattern portion 20a2 has a primary structure.

Furthermore, when a value of m mentioned above is set to, e.g., 2 (or a natural number m equal to or above 2), as shown in FIG. 9, the tier height of the tiers of the outer circular side tiered diffraction pattern portion 20a3 becomes approximately 2λ-fold (or approximately mλ-fold) of the designed wavelength λ. In this case, as shown in FIG. 14 in an enlarged manner, when the outer circular side tiered diffraction pattern portion 20a3 is sectionalized in a tiered shape so that the tier height of the tiers becomes approximately 2λ-fold (approximately mλ-fold . . . not shown) of the designed wavelength λ with respect to the outer circular side phase function curve, the outer circular side tiered diffraction pattern portion 20a3 has a secondary (or higher-order . . . not shown) structure.

Moreover, when a value of m mentioned above is changed and set in accordance with each tier in the tiered structure, as shown in FIG. 10, there is obtained an aperiodic structure in which the tier height of the tiers of the outer circular side tiered diffraction pattern portion 20a4 varies in accordance with each tier.

It is to be noted that although the diffractive optical element 20 shown in FIGS. 8 to 10 is manufactured based on the inner circular side phase function curve (the first phase function curve) and the outer circular side phase function curve (the second phase function curve) shown in FIGS. 11 and 12, just a concept of the diffractive optical element 20 is illustrated. The irregular portions on the inner circular side, the number of tiers on the outer circular side, a relationship in tiers between the inner circular side and the outer circular side, a pitch of the circular zone and others are not accurately drawn, but they are conceptually illustrated.

In this example, when a height of the convex portion of the inner circular side irregular diffraction pattern portion 20a1 of the diffractive optical element 20 and a tier height of the outer circular side tiered diffraction pattern portion 20a2 of the same are both set to approximately one wavelength (approximately 1λ) of the designed wavelength λ, as shown in FIGS. 8A and 8B, a second laser light aperture limiting portion 20b1 which limits the second laser light L2 so that a numerical aperture (NA) into the objective lens 21 becomes 0.6 is formed in an annular shape by using a dichroic film in the outer circular area of the undersurface 20b facing the outer circular side tiered diffraction pattern portion 20a2. This second laser light aperture limiting portion 20b1 has characteristics which transmit the first laser light L1 having the reference wavelength λ1=408 nm±8 nm exiting from the blue semiconductor laser 11 (FIG. 7) therethrough by this dichroic film having the wavelength selectivity and prevent transmission of the second laser light L2 having the reference wavelength λ2=655 nm±10 nm exiting from the red semiconductor laser 31 (FIG. 7). Therefore, the outer circular side tiered diffraction pattern portion 20a2 of the diffractive optical element 20 is an area dedicated to the Blu-ray Disc.

On the other hand, in case of the outer circular side tiered diffraction pattern portion 20a3 having the secondary structure shown in FIG. 9 or the outer circular side tiered diffraction pattern portion 20a4 having the aperiodic structure shown in FIG. 10, there is a merit that light beams only which are required for reproduction of information of the DVD on the inner side can be separated without providing the second laser light aperture limiting portion or the like having the wavelength selectivity with respect to the second laser light L2 on the outer circular side which is an unnecessary light for the DVD 2. That is because a difference in orders in the diffraction pattern structure between the inner circular side and the outer circular side means a difference in orders of the diffraction effect, the continuity of the wavefront is disrupted at the boundary between the inner and outer peripheries due to this difference, and a light beam on the outer circular side is separated from a light beam on the inner circular side, which does not affect a spot on the DVD 2 formed by the light beam on the inner circular side.

It is to be noted that provision of the second laser light aperture limiting portion 20b1 which prevents transmission of the second laser light L2 for the DVD 2 on the outer circular side of the undersurface 20b of the diffractive optical element 20 can of course reduce the degree of influence of the light on the outer circular side and improve the recording characteristics or the reproduction characteristics for the DVD 2 even when the outer circular side has the structure of a higher order (a second order or above) or the aperiodic structure.

Additionally, when the outer circular side has the structure of a higher order (a second order or above) or the aperiodic structure, a large pitch (interval) of the tiers in the outer circular side tiered diffraction pattern portions 20a3 and 20a4 can be set, and there is a merit that production of the diffractive optical element 20 can be facilitated.

Based on this, since the function which changes an aberration due to a wavelength error with respect to the first laser light L1 by transmission of the first laser light L1 only is added by such a diffraction structure of the tiers that a difference in optical path length between tiers is an approximately integral multiple of the first laser light L1 for the Blu-ray Disc, the outer circular side tiered diffraction pattern portion 20a2 or 20a3 or 20a4 formed in the outer circular area of the diffractive optical element 20 can perform the correction concerning a chromatic aberration. On the other hand, since the second laser light L2 for the DVD is not transmitted through this pattern portion, this light does not act on this portion at all.

Here, again referring-to FIG. 7, the objective lens 21 which is the primary part-in Embodiment 1 is designed for the Blu-ray Disc, the surface 21a facing the diffractive optical element 20 is formed into an aspherical shape by substituting the aspherical surface coefficients $B_4$ to $B_{16}$ shown in Table 6 in the aspherical surface polynomial shown in Expression (3) and the surface 21b facing the Blu-ray Disc 1 or the DVD 2 is also formed into an aspherical shape by substituting the aspherical coefficients $B_4$ to $B_{10}$ shown in Table 7 in the aspherical polynomial shown in Expression (3) by using a glass material, e.g., NBFD13 (optical glass manufactured by HOYA) as shown in Table 2.

In this example, a working distance between the surface 21b of the objective lens 21 and the laser bean incidence surface 1a of the Blu-ray Disc 1 is approximately 0.77 mm as shown in Table 2, and a working distance between the surface 21b of the objective lens 21 and the laser beam incidence surface 2a of the DVD 2 is approximately 0.67 mm as shown in Table 2.

Additionally, as the objective lens 21 optimally designed in an infinitely conjugated state so that information is recorded or reproduced onto or from the Blu-ray Disc 1 by using the first laser light L1 whose reference wavelength $\lambda 1$ is 408 nm, there is used an objective lens in which the reference wavelength $\lambda 1$ of the first laser light L1 exiting from the blue semiconductor laser 22 (FIG. 7) is set to, e.g., 408 nm, the numerical aperture (NA) is 0.85, the focal distance is 2.0 mm and the incidence pupil diameter (a pupil diameter) is 3.4 mm.

In this example, when the disc substrate thickness d1 (FIG. 7) of the Blu-ray Disc 1 is 0.11 mm, an aberration of the objective lens 21 is substantially completely corrected, and FIG. 15 shows a longitudinal aberration of this single objective lens to a ray height of 1.7 mm which is a ray height corresponding to NA=0.85. In FIG. 15, a longitudinal aberration when the wavelength is 411 nm slightly deviating from the reference wavelength $\lambda 1$ of the first laser light L1 is also shown as well as that when the reference wavelength $\lambda 1$ is 408 nm. A difference in image forming position of the epaxial light rays is an epaxial chromatic aberration, and bending of the longitudinal aberration with 411 nm represents a spherical aberration due to a wavelength error.

Meanwhile, in Table 2, although an object point is set at a finite distance (−3250 mm). That is because the chromatic aberration correction element 17 has a slight lens effect with 408 nm and hence this distance is set in order to cancel out this effect and cause the parallel light to enter the objective lens 21.

On the other hand, FIG. 16 shows a longitudinal aberration of the entire optical system including the chromatic aberration correction element 17 and the objective lens 21 with respect to the first laser light L1 for the Blu-ray Disc, and this longitudinal aberration view shows a state in which the outer circular side tiered diffraction pattern portion 20a2 or 20a3 or 20a4 to which the function which corrects a chromatic aberration with respect to the first laser light L1 is added is not included although the inner circular side irregular diffraction pattern portion 20a1 of the diffractive optical element 20 which does not act on the first laser light L1 at all may be included.

In this example, comparing the longitudinal aberration of the entire optical system shown in FIG. 16 with the longitudinal aberration of the single objective lens shown in FIG. 15, it can be understood that the chromatic aberration is excessively corrected and a focal position with 411 nm is placed on the object point side apart from a focal position with 408 nm.

Meanwhile, since a numerical aperture (NA) of the objective lens 21 required for recording or reproduction of information onto or from the DVD 2 is 0.6, a state of image formation can be changed by the diffractive optical element 20 according to Embodiment 1 on the outer side away from the ray height of 1.2 mm (=1.7 mm×0.6/0.85) for this numerical aperture. It is to be noted that an objective lens whose NA is larger than 0.6, e.g., 0.65 may be used in a recording type DVD device or the like in some cases. In such a case, determining a ray height for this NA as a radius of switching the design can suffice. In this example, a radius of 1.25 mm is determined as a boundary in order to give a margin to the numerical aperture (NA) for the DVD 2. Therefore, a range of the ray height from 0.735 (1.7 mm is standardized as 1.0 in the drawing) to 1.0 in FIG. 16 corresponds to the outer circular area with respect to the first laser light L1 for the Blu-ray Disc. In this example, a wavefront aberration with 411 nm is 0.010λ on the inner side whose boundary is defined by the radius 1.25 mm.

In this example, a design principle of the outer circular area in the diffractive optical element 20 according to Embodiment 1 will now be conceptually described with reference to FIG. 17. That is because a degree of the aberration correction is very high and the aberration correction which is close to almost no aberration in terms of a wavefront aberration is realized in the objective lens 21 shown in Table 1, but a small undulation exists in the longitudinal aberration view. Therefore, in order to theoretically explain, giving a description on an ideal lens having no undulation can facilitate understanding.

First, confirming a purpose of the chromatic aberration correction in the outer circular side tiered diffraction pattern portion 20a2 (FIG. 8A) or 20a3 (FIG. 9) or 20a4 (FIG. 10) of the diffractive optical element 20, the purpose is minimizing an aberration of a light beam when a wavelength change is generated on an image surface of 408 nm. Therefore, in the case of the outer circular side tiered diffraction pattern portion indicated by a solid line in FIG. 17, it is good enough to match the best image surface of the light ray on the inner circular side with the best image surface of 408 nm. Further, on the outer circular side, forming an image on the same surface as that of 408 nm by the effect of the diffractive optical element 20 can suffice. By doing so, a wavefront aberration is not generated at a part with a large superficial content on the outer circular side, thereby considerably suppressing an increase in the wavefront aberration.

On the other hand, in the case of no outer circular side tiered diffraction pattern portion indicated by a broken line in FIG. 17, a degree of the correction of the chromatic aberration correction element 17 is increased, the epaxial chromatic aberration is excessively corrected. If there is a wavelength error, when the longitudinal aberration is formed as indicated by the broken line, the best image surface when there is a wavelength error is matched with the image surface of 408 nm, thereby achieving the objective. In this case, however, a change quantity of the ray aberration is large, and the wavefront aberration becomes large as compared with the case where the outer circular side tiered diffraction pattern portion is provided.

An operation when the optical system in Embodiment 1 is used will now be described.

Figure 18:
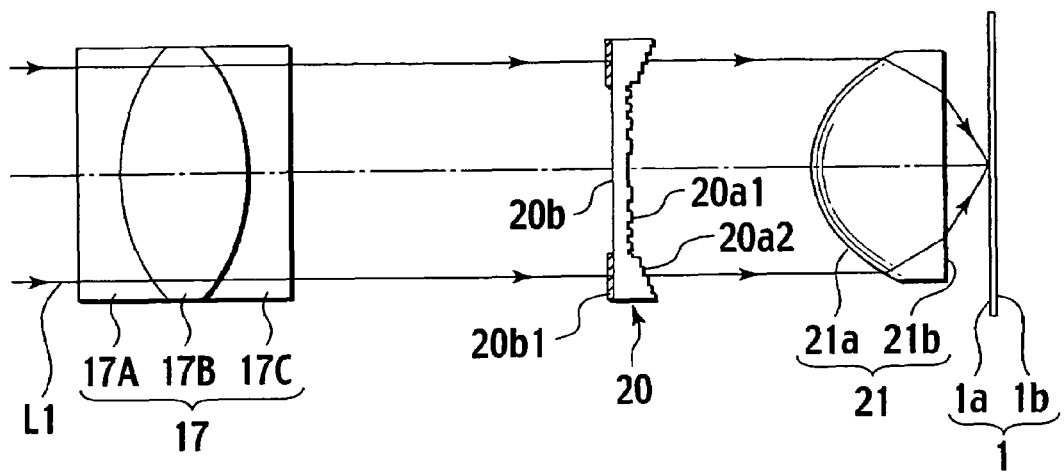
FIG. 18 is a light path view in a Blu-ray Disc in Embodiment 1.
Figure 19:
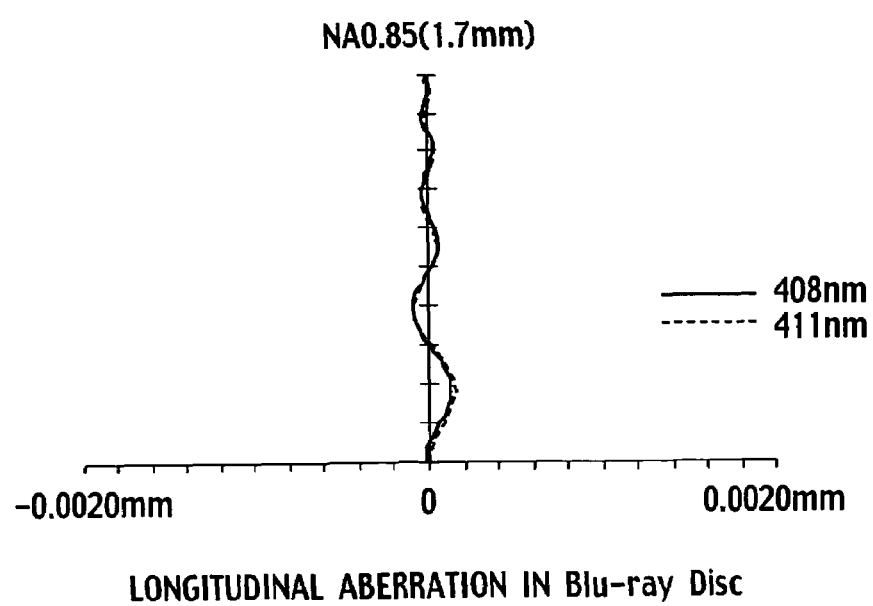
FIG. 19 is a longitudinal aberration view in the Blu-ray Disc in Embodiment 1.
Figure 20:
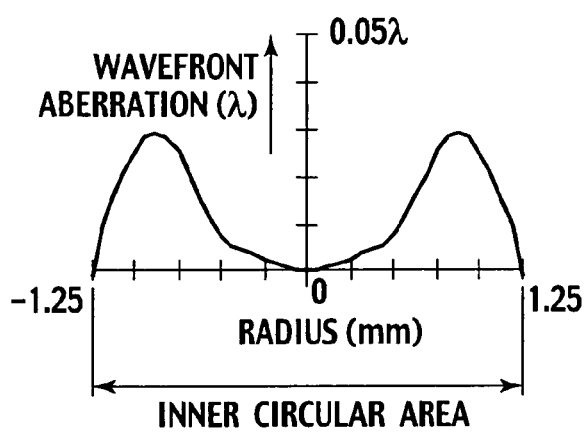
FIG. 20 is a wavefront aberration view on the inner circular side when a wavelength is changed from a reference wavelength in the Blu-ray Disc in Embodiment 1.
Figure 21:
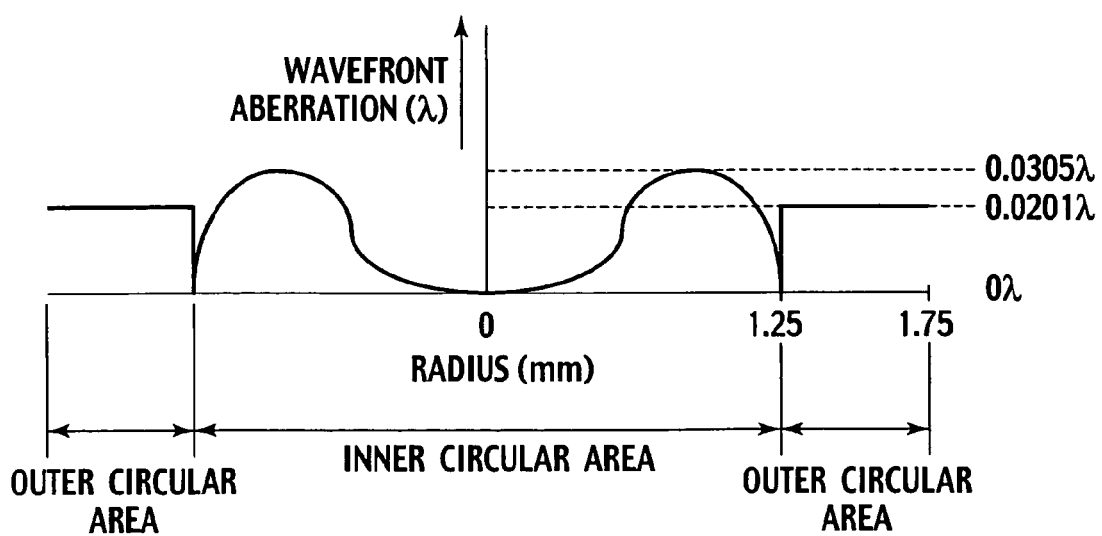
FIG. 21 is a wavefront aberration view of the inner circular side and the outer circular side when a wavelength is changed form a reference wavelength in the Blu-ray Disc in Embodiment 1.
Figure 22:
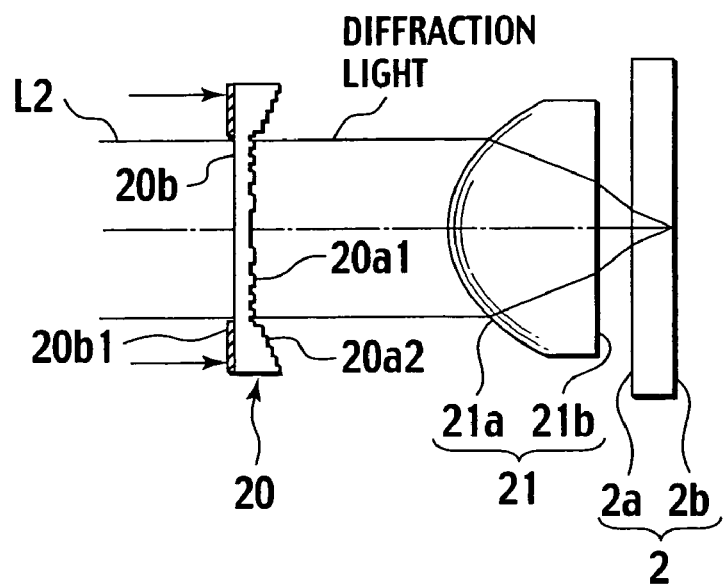
FIG. 22 is a light path view in a DVD in Embodiment 1.
Figure 23:
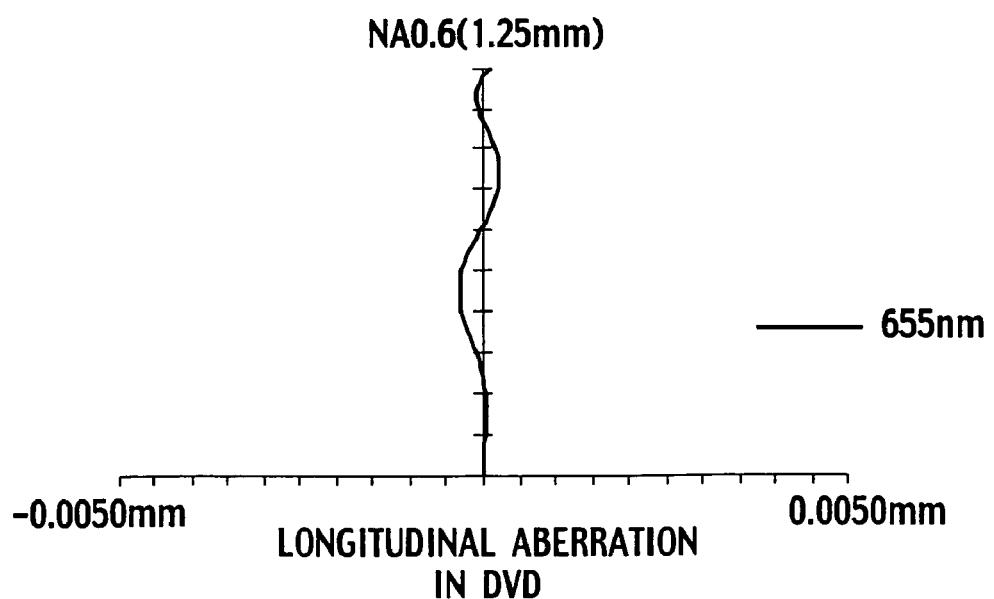
FIG. 23 is a longitudinal aberration view in the DVD in Embodiment 1.

FIG. 18 is an optical path view in the Blu-ray Disc in Embodiment 1. FIG. 19 is a longitudinal aberration view in the Blu-ray Disc in Embodiment 1. FIG. 20 is a wavefront aberration view of the inner circular side when the wavelength is changed from the reference wavelength in the Blu-ray Disc in Embodiment 1. FIG. 21 is a wavefront aberration view of the inner circular side and the outer circular side when the wavelength is changed from the reference wavelength in the Blu-ray Disc. FIG. 22 is an optical path view in the DVD in Embodiment 1. FIG. 23 is a longitudinal aberration view in the DVD in Embodiment 1.

First, FIG. 18 shows the optical path view in the Blu-ray Disc, FIG. 19 shows the longitudinal aberration view in the Blu-ray Disc, FIG. 20 shows the wavefront aberration view of the inner circular side when the wavelength is changed from the reference wavelength in the Blu-ray Disc and FIG. 21 shows the wavefront aberration view of the inner circular side and the outer circular side when the wavelength is changed from the reference wavelength in the Blu-ray Disc when recording or reproducing information onto or from the Blu-ray Disc 1 in Embodiment 1.

That is, the chromatic aberration correction element 17 formed by attaching the concave lens 17A, the convex lens 17B and the concave lens 17C is arranged on the blue semiconductor laser 11 (FIG. 7) side when recording or reproducing information onto or from the Blu-ray Disc 1 by the optical system shown in FIG. 18.

Further, the first laser light L1 exiting from the blue semiconductor laser 11 (FIG. 7) is converted into a parallel light by the collimator lens 14 (FIG. 7), and the parallel light obtained from the first laser light L1 is caused to enter the inner circular area and the outer circular area of the undersurface 20b of the diffractive optical element 20 through the chromatic aberration correction element 17. In this example, although the second laser light aperture limiting portion 20b1 is formed in a ring-like shape in the outer circular area of the undersurface 20b of the diffraction optical shift element 20 by using the dichroic film, the first laser light L1 is transmitted through the inner circular area of the undersurface 20b and the second laser aperture limiting portion 20b1 as it is, then transmitted through the inner circular side irregular diffraction pattern portion 20a1 and the outer circular side tiered diffraction pattern portion 20a2 as it is, and caused to enter the surface 21a of the objective lens 21 while remaining as the parallel light.

At this time, although the height of the convex portion is set to approximately 1λ-fold of the designed wavelength λ with respect to the concave portion in the inner circular side irregular diffraction pattern portion 20a1 of the diffractive optical element 20 as described in conjunction with FIGS. 8A and 8B, the inner circular side irregular pattern portion 20a1 does not act on the first laser light L1 at all and causes 0-order diffraction light to enter the objective lens 21. On the other hand, since the tier height of the tiers in the outer circular side tiered diffraction pattern portion 20a2 is set to approximately 1λ-fold of the designed wavelength λ as described with reference to FIGS. 8A and 8B, the wavefront is not changed with respect to the first laser light L1 whose reference wavelength λ1 is 408 nm, but the outer circular side tiered diffraction pattern portion 20a2 corrects a chromatic aberration with respect to the wavelength slightly deviating from the reference wavelength λ1.

It is to be noted that such a secondary (or higher-order . . . not shown) structure as shown in FIG. 9 or such an aperiodic structure as shown in FIG. 10 can be also adopted as the diffractive optical element 20 and, in such a case, a difference lies in that the second laser light aperture limiting portion is not usually provided on the undersurface 20b.

Furthermore, the first laser beam narrowed down by the objective lens 21 is caused to enter from the laser beam incidence surface 1a of the Blu-ray Disc 1 and condensed on the signal surface 1b having the disc substrate thickness of 0.1 mm.

In this case, the longitudinal aberration view in the Blu-ray Disc 1 is as shown in FIG. 19. In particular, since the diffractive optical element 20 has the outer circular side tiered diffraction pattern portion 20a2 provided in the outer circular area, there is no influence when the wavelength of the first laser light L1 is 408 nm. On the other hand, it can be understood that the effect described with reference to FIG. 17 is obtained with the wavelength of 411 nm. In other words, no aberration is generated at the portion outside the circle defined by the diameter of 2.5 mm of the diffractive optical element 20. Here, since the wavefront aberration is 0.010λ at the portion inside the circle defined by the diameter of 2.5 mm of the diffractive optical element 20, a value of the wavefront aberration on the entire surface of the objective lens 21 is as very small as 0.0074λ (=0.010λ×2.5/3.4).

Here, giving a description on an effect of the optical path view in the Blu-ray Disc in Embodiment 1, a radius of the attached surface obtained when forming the chromatic aberration correction element by attaching the concave lens, the convex lens and the concave lens is ±2.87 mm when providing no outer circular side tiered diffraction pattern portion in the outer circular area of the diffractive optical element as indicated by the dotted line in FIG. 17 as the comparative example, and this radius of ±2.87 mm has a very deep shape, and hence it can be said that this is the chromatic aberration correction element which is hard to be produced. Moreover, when the chromatic aberration correction element having the attached surface whose radius is ±2.87 mm without the diffractive optical element is used as the comparative example, a value rms of a wavefront aberration is as large as 0.046λ when a wavelength of the first laser light L1 is 411 nm.

On the other hand, since the diffractive optical element 20 is provided in Embodiment 1, the radius of the attached surface of the chromatic aberration correction element 17 is ±3.25 mm as shown in Table 2, and the radius of the attached surface of the chromatic aberration correction element 17 can be considerably alleviated as compared with the comparative example. Therefore, alleviation of the radius of the attached surface of the chromatic aberration correction element 17 described above facilitates production of the chromatic aberration correction element 17, which is very effective. Additionally, in cases where the chromatic aberration correction element 17 having the attached surface whose radius is 3.25 mm with the diffractive optical element 20 is used, the value rms of the wavefront aberration is 0.0074λ when the wavelength of the first laser light L1 is 411 nm, and the aberration can be suppressed to approximately ⅙ or less as compared with the comparative example. These numerical values demonstrate the effectivity with respect to the Blu-ray Disc 1.

Meanwhile, in order to demonstrate the effect of Embodiment 1 to the maximum level and realize the above, a wavefront (=an optical phase difference) must be considered in addition to a geometrical-optical aberration. This is realized if the wavefront is connected in an optimum state when there is a wavelength error between the inner circular area and the outer circular area of the diffractive optical element 20.

FIG. 20 shows a wavefront aberration view, i.e., an optical phase difference (OPD) of the inner circular side when the wavelength of the first laser light L1 for the Blu-ray Disc is 411 nm. It can be said that this OPD shows a shape of the wavefront. This OPD shape indicates a conformation in which a value rms of a wavefront aberration becomes minimum when there is a spherical aberration. In this example, when the wavefront (OPD) of a light ray on the outer circular side is caused to substantially match with an average value (an average value of the OPD) of the wavefront on the inner circular side, the value rms of the wavefront aberration on the entire surface becomes minimum.

In Embodiment 1, when the inner circular portion diameter φD1 (FIG. 8) of the diffractive optical element 20 is standardized as 1, a tertiary spherical aberration coefficient W40 is −0.122 λ.

FIG. 20 shows the OPD when a focal point adjusting component W20 having the measurement is given. It is to be noted that, since a spherical aberration of a higher order actually remains to some extent, an aberration quantity in FIG. 19 slightly (negligibly) deviates from a value calculated from the tertiary spherical aberration.

Meanwhile, when such a tertiary spherical aberration is given, an average wavefront Wm is W40/6. In this example, Wm=0.0201λ is achieved. It is to be noted that a maximum value of the wavefront aberration (a value PV) in such a case is −0.25×W40, and 0.0305λ is a maximum value in a concrete example. Therefore, it is desirable for the outer circular area of the diffractive optical element 20 to have this OPD of the average wavefront Wm. FIG. 21 schematically shows this.

Therefore, when the inner circular area side and the outer circular area side of the diffractive optical element 20 have the same substrate thickness, since the wavefront on the outer circular area side matches with the wavefront of the lens center on the inner circular area side, the wavefront aberration is increased. This is a phenomenon which is generated because coupling of the wavefront is not optimum even though the outer circular area side geometrical-optically exists on the best image surface.

Thus, coupling is optimized as much as possible by adjusting the substrate thickness of the outer circular side of the diffractive optical element 20. In this example, since a change quantity of the substrate thickness of the outer circular area side of the diffractive optical element 20 must not be affected by the reference wavelength λ1 of the first laser light L1, it is optimum to set the change quantity corresponding to a difference in optical path length which is an integral multiple of the reference wavelength λ1 of the first laser light L1.

Specifically, as shown in FIG. 21, on the outer circular side of the diffractive optical element 20, it is desirable that the wavefront advances when the wavelength of the first laser light L1 is long. Therefore, it is good enough to form the substrate thickness on the outer circular area side of the diffractive optical element 20 longer than that of the inner circular area side of the same.

Concrete numerical values will now be given. Since a change amplitude of the wavelength of the first laser light L1 which is currently discussed is small, it is possible to nearly consider without problem that a refraction index of the first laser light L1 with respect to the diffractive optical element 20 does not vary.

In this example, a change Φ in wavefront caused due to a fact that the wavelength of the first laser light L1 varies from λ1 to λ1' can be given by an expression Φ=m(λ1-λ1')/λ1' where m is an order of the tier pitch.

Since change from 408 nm to 411 nm causes a changing rate of 0.0201 λ in the example, m=2.72 is achieved. It is desirable that m is an integer because of the above-described restriction. Therefore, the closest integer m is 3. Further, it is good enough to increase a height of the outer circular side tiered diffraction pattern portion 20a2 with respect to the inner circular side irregular diffraction pattern portion 20a1 by approximately 3λ-fold of the designed wavelength λ, connect these portions and increase a substrate thickness of the outer circular area side in the diffractive optical element 20 having the primary structure shown in FIGS. 8A and 8B, the diffractive optical element 20 having the secondary (the higher-order . . . not shown) structure shown in FIG. 9 or the diffractive optical element 20 having the aperiodic structure shown in FIG. 10.

FIG. 22 shows the optical path view in the DVD and FIG. 23 shows the longitudinal aberration view in the DVD when recording or reproducing information onto or from the DVD 2 in Embodiment 1.

That is, when recording or reproducing information onto or from the DVD 2 by the optical system shown in FIG. 22, the chromatic aberration element is not arranged on the red semiconductor laser 31 (FIG. 7) side, the second laser light L2 exiting from the red semiconductor laser 31 (FIG. 7) is converted into a parallel light by the collimator lens 34 (FIG. 7), the parallel light obtained from the second laser light L2 is prevented from being transmitted and restricted by the second laser light aperture limiting portion 20b1 formed in the outer circular area of the undersurface 20b of the diffractive optical element 20 so that a numerical aperture (NA) with respect to the objective lens 21 becomes 0.6, and the parallel light of the second laser light L2 is caused to enter the inner circular area only of the undersurface 20b of the diffractive optical element 20. Thereafter, the second laser light L2 is caused to enter the surface 21a of the objective lens 21 while correcting a spherical aberration by the 1$^{st}$ order diffraction light diffracted by the inner circular side irregular diffraction pattern portion 20a1 of the diffractive optical element 20.

Then, the second laser beam narrowed down by the objective lens 21 is caused to enter the laser beam incidence surface 2a of the DVD 2 and condensed on the signal surface 2b having the disc substrate thickness of 0.6 mm.

In this case, since the objective lens 21 is designed for the Blu-ray Disc, a spherical aberration becomes large with respect to the second laser light L2 having the wavelength λ2 of 655 nm exiting from the red semiconductor laser 31 (FIG. 7), but the spherical aberration is corrected by using the inner circular side irregular diffraction pattern portion 20a1 of the diffractive optical element 20. Therefore, recording or reproduction of information onto or from the DVD 2 is not obstructed.

Figure 1:
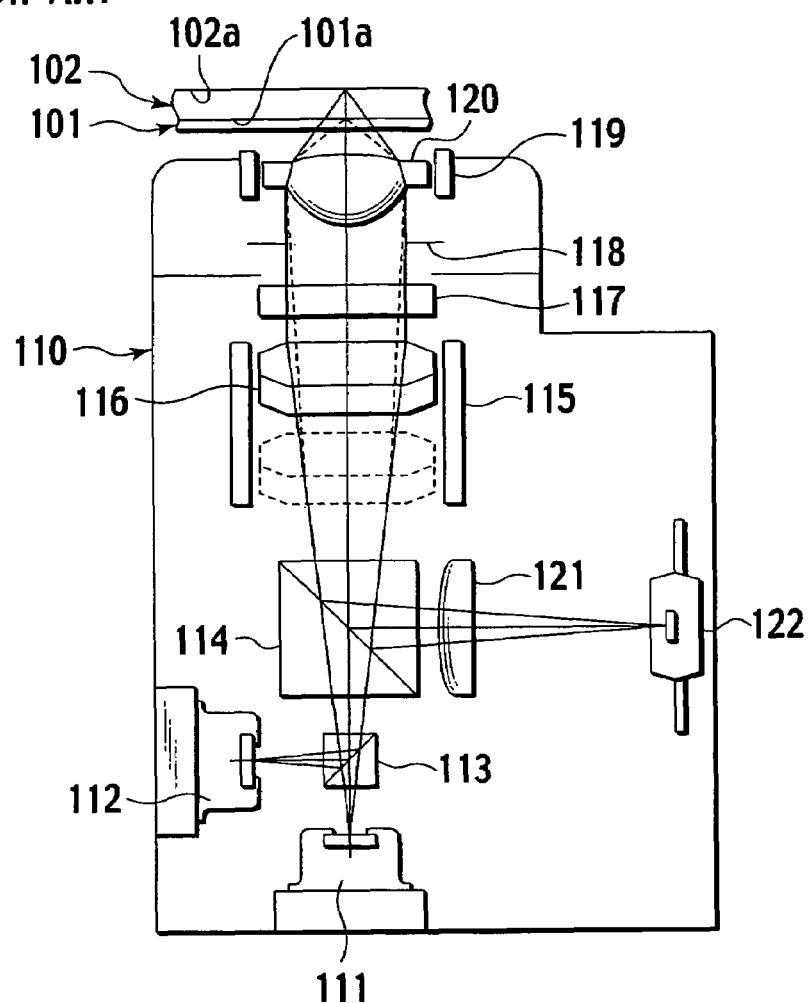
FIG. 1 is a view schematically showing an optical system of an optical pickup device according to Conventional Example 1.
Figure 2:
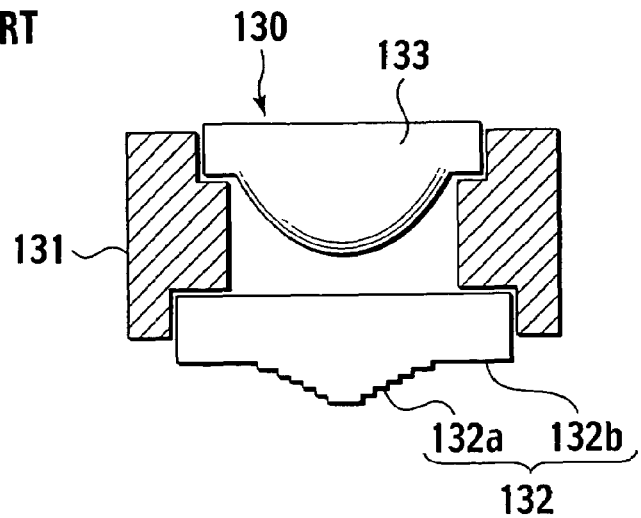
FIG. 2 is a view schematically showing an optical system of an optical pickup device according to Conventional Example 2.
Figure 3:
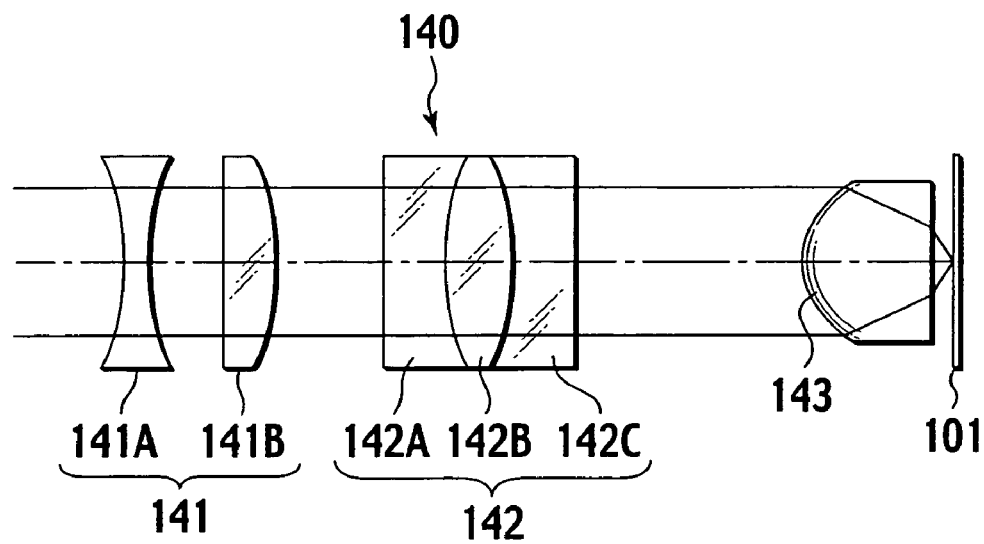
FIG. 3 is a view schematically showing an optical system of an optical pickup device according to Conventional Example 3.
Figure 4:
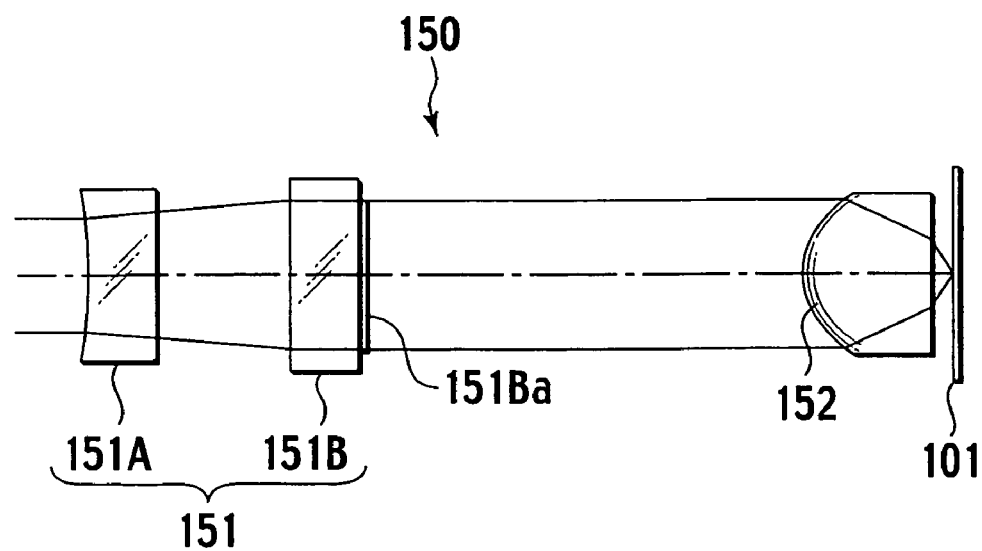
FIG. 4 is a view schematically showing an optical system of an optical pickup device according to Conventional Example 4.
Figure 5:
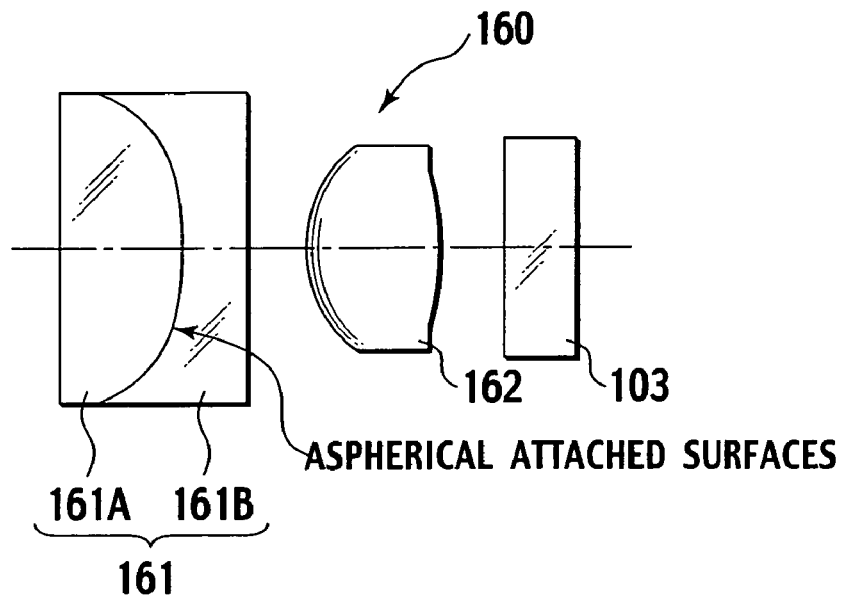
FIG. 5 is a view schematically showing an optical system of an optical pickup device according-to Conventional Example 5.

Additionally, in the longitudinal aberration view in the DVD depicted in FIG. 23, a ray height of 1.25 mm which corresponds to a numerical aperture (NA) 0.6 of the objective lens 21 is shown, and the spherical aberration is corrected with respect to the DVD 2 in the inner circular area whose inner circular portion diameter λD1 (FIG. 2) is 2.5 mm or below.

Embodiment 2

Figure 24:
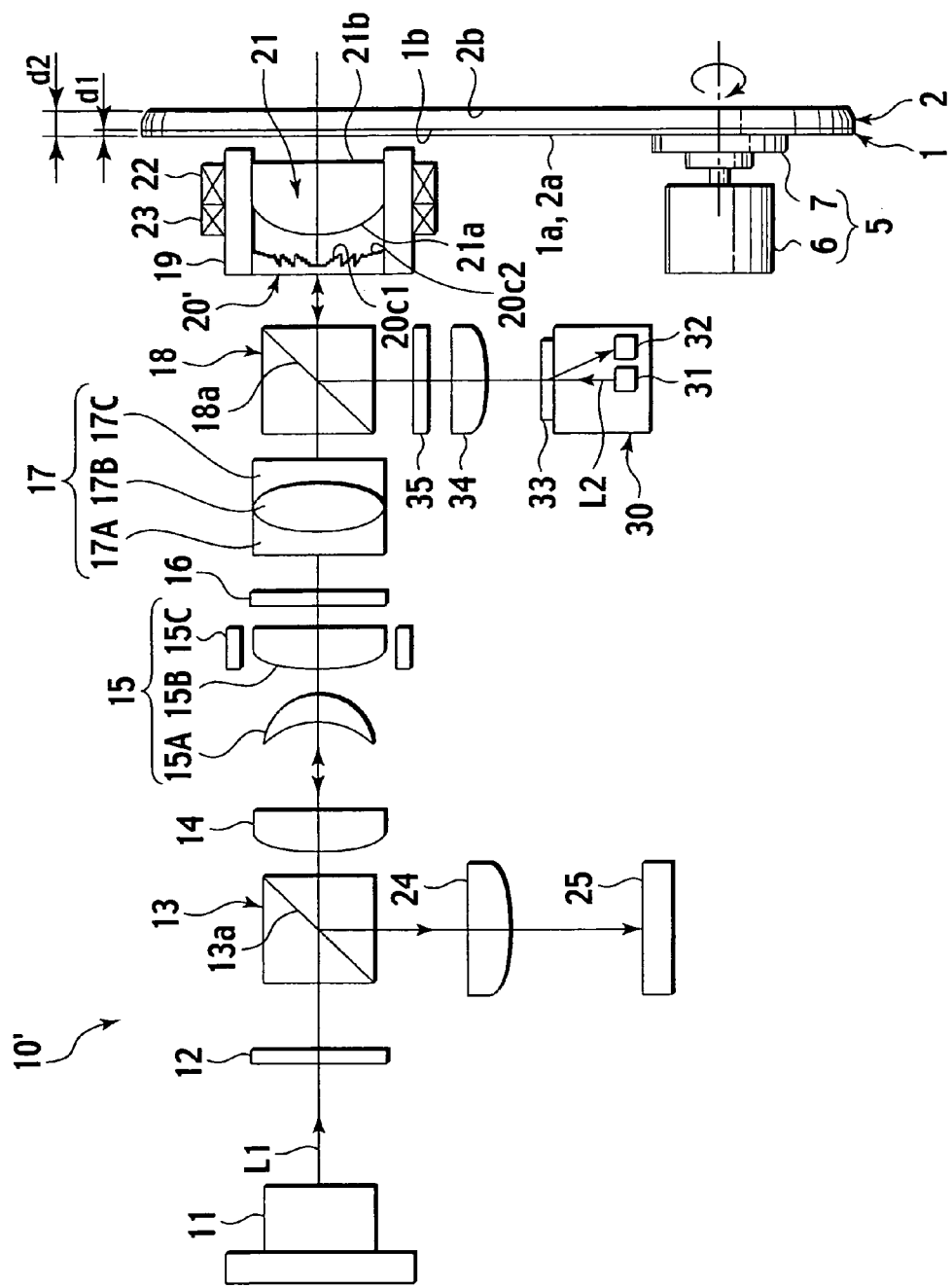
FIG. 24 is a view showing an entire structure of an optical pickup device in Embodiment 2 according to the present invention.
Figure 25A:
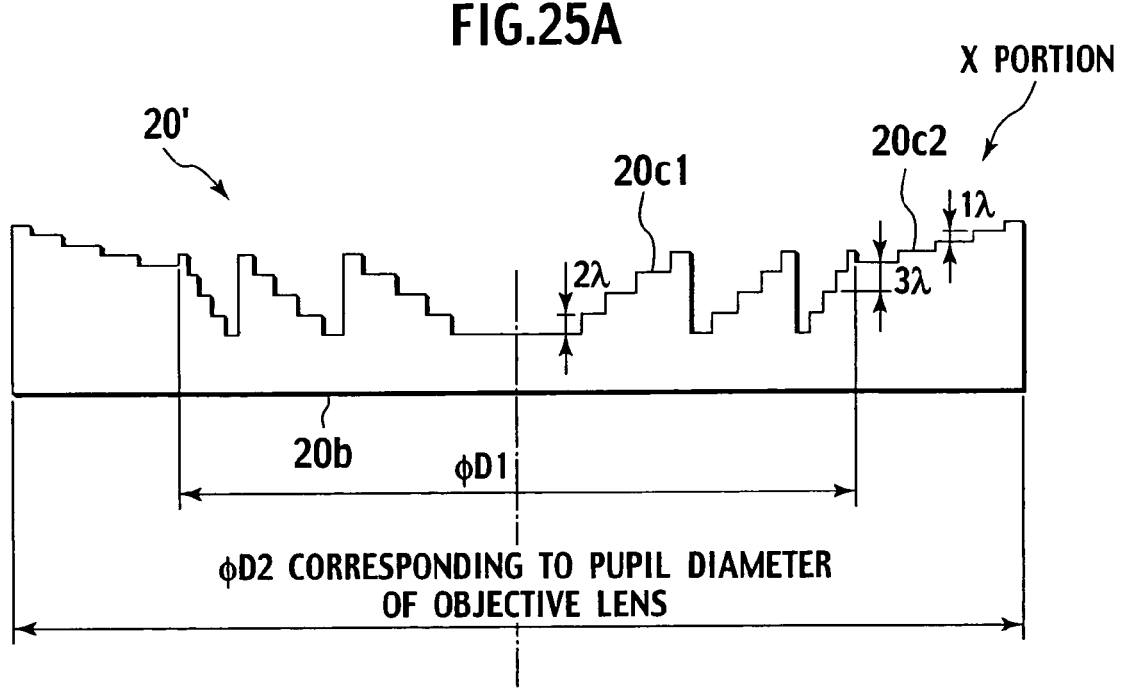
FIGS. 25A and 25B are a general view and an enlarged view of an X portion illustrating a diffractive optical element of Embodiment 2 according to the present invention.
Figure 25B:
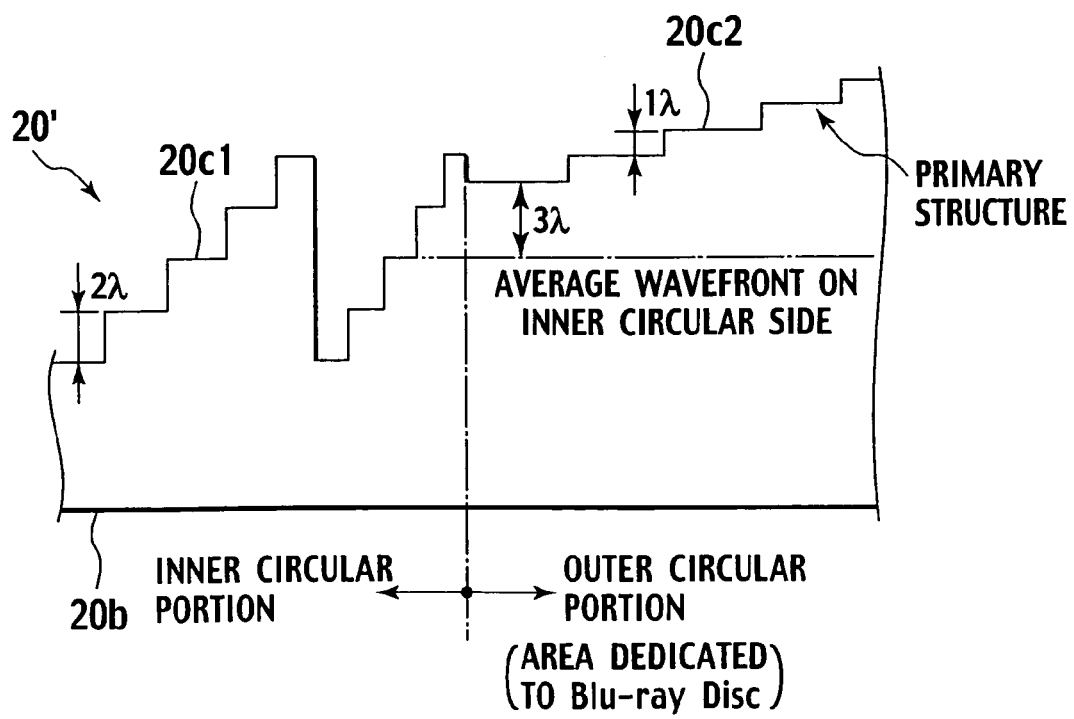
Figure 26:
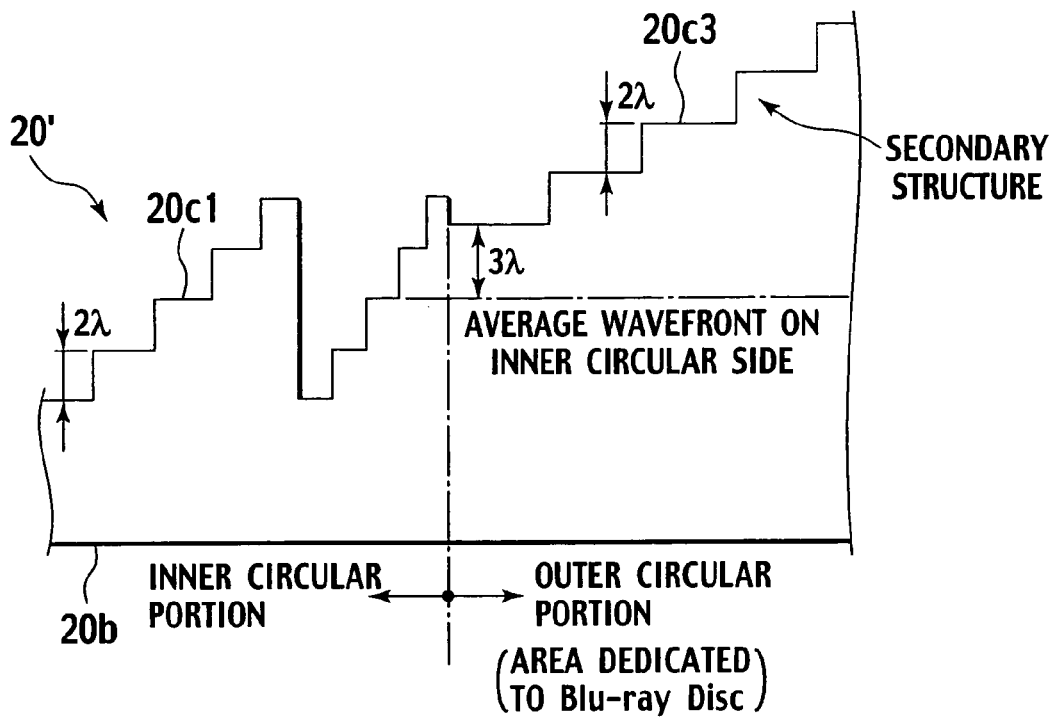
FIG. 26 is a view showing Modification 1 obtained by partially modifying the diffractive optical element in Embodiment 2 according to the present invention.
Figure 27:
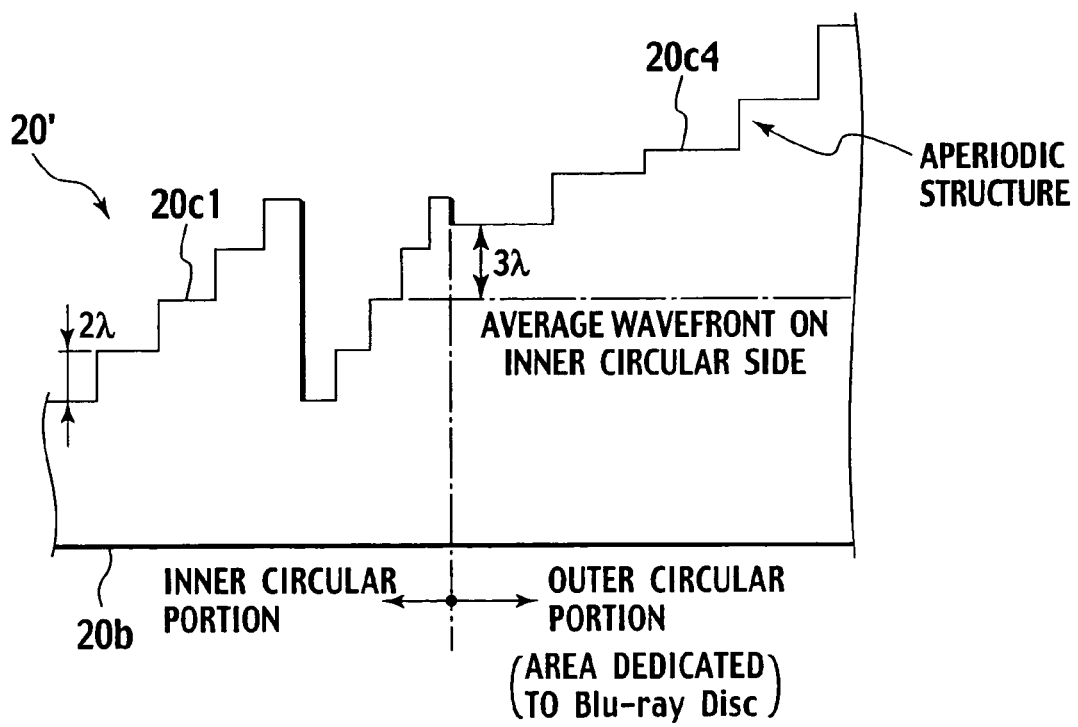
FIG. 27 is a view showing Modification 2 obtained by partially modifying the diffractive optical element in Embodiment 2 according to the present invention.

FIG. 24 is a view showing an entire structure of an optical pickup device of Embodiment 2 according to the present invention. FIGS. 25A and 25B are a general view and an enlarged view of an X portion illustrating a diffractive optical element in Embodiment 2 according to the present invention. FIG. 26 is a view showing Modification 1 obtained by partially modifying the diffractive optical element in Embodiment 2 according to the present invention. FIG. 27 is a view showing Modification 2 obtained by partially modifying the diffractive optical element in Embodiment 2 according to the present invention.

As shown in FIG. 24, an optical pickup device 10' of Embodiment 2 is configured by substituting the diffractive optical element 20 in the optical pickup device 10 in Embodiment 1 described with reference to FIG. 7 with a diffractive optical element 20' having a different shape, and a description will be mainly given on a difference from Embodiment 1.

That is, as shown in FIGS. 25A and 25B, the diffractive optical element 20' which is a primary part of Embodiment 2 also includes a function which corrects a spherical aberration generated due to a difference in substrate thickness between a Blu-ray Disc1 and a DVD 2.

The diffractive optical element 20' is likewise integrally formed by using transparent BK7 (borosilicate crown glass . . . optical glass manufactured by HOYA) having the optical transparency, a quartz substrate or a transparent resin, and BK7 is used in this Embodiment 2 as shown in Table 2.

Additionally, in the diffractive optical element 20, an inner circular side tiered diffraction pattern portion 20c1 is formed in an annular shape (a ring shape) within a predetermined inner circular area diameter φD1 for the correction of a spherical aberration generated due to a difference in substrate thickness between the Blu-ray Disc 1 and the DVD 2 centering on a central point "0" through which the optical axis runs on the upper surface (one surface) side facing an objective lens 21 (FIG. 7) while gradually changing a pitch of each set of a plurality tiers in the radial direction toward the outer circular side, and an outer circular side tiered diffraction pattern portion 20c2 is formed in an annular shape (a ring shape) within at least a predetermined outer circular portion diameter φD2 outside this inner circular side tiered diffraction pattern portion 20a1. Therefore, a spherical aberration can be corrected with respect to a second laser light L2 for the DVD by the inner circular side tiered diffraction pattern 20c1, and a chromatic aberration can be corrected with respect to a first laser light L1 for the Blu-ray Disc by the outer circular side tiered diffraction pattern portion 20c2. In this example, the predetermined inner circular portion diameter φD1 with which the inner circular side tiered diffraction pattern portion 20c1 is formed is set to φ2.5 mm, whilst the predetermined outer circular portion diameter φD2 with which the outer circular side tiered diffraction pattern portion 20c2 is formed is set to φ3.4 mm, and a pupil diameter of the objective lens 21 (FIG. 7) is φ3.4 mm as shown in Table 1. Therefore, the entire surface of this pupil diameter can be covered.

Giving a more concrete description, first, as to the inner circular side tiered diffraction pattern portion 20c1 formed in the inner circular area of the diffractive optical element 20', a wavelength having the same value (408 nm) as the reference wavelength λ1 of the first laser light L1 is determined as the designed wavelength λ, the phase function coefficients $A_2$ to $A_8$ of the second to eighth orders shown in Table 4 are substituted in the first phase function Φ(h) shown in Expression (1) in order to obtain the inner circular side function curve (the first phase function curve) shown in FIG. 11, and the inner circular side tiered diffraction pattern portion 20c1 is formed based on a curve having a radius equal to or smaller than 1.25 mm in the inner circular side phase function curve. In the inner circular side tiered diffraction pattern portion 20c1, a tier height of tiers formed toward the central point "0" side is set to approximately 2λ-fold of the designed wavelength λ, and the plurality of tiers is determined as one tier and a plurality of such tiers are repeatedly formed in an annular shape in accordance with the inner circular side phase function curve (the first phase function curve) while gradually changing a pitch in the radial direction toward the outer circular side.

In this example, the inner circular side tiered diffraction pattern portion 20c1 can be determined by setting a pattern in accordance with approximately 2λ of the tier height of the tiers as shown in FIG. 14 with respect to the inner circular side phase function curve (the first phase function curve) in FIG. 11 obtained based on the first phase function Φ(h).

Based on this, since the tier height of the tiers is set to approximately 2λ, the inner circular side tiered diffraction pattern portion 20c1 formed in the inner circular area of the diffractive optical element 20' allows transmission of 0-order diffraction light which does not act on the first laser light L1 for the Blu-ray Disc at all therethrough and, on the other hand, corrects a spherical aberration by using $1^{st}$ order diffraction light obtained by diffracting the second laser light L2 for the DVD.

Next, as to the outer circular side tiered diffraction pattern portion 20c2 formed in the outer circular area of the diffractive optical element 20, a wavelength having the same value (408 nm) as the reference wavelength λ1 of the first laser light L1 is determined as the designed wavelength λ, the phase function coefficients $A'_2$ to $A'_8$ of the second to eighth orders shown in Table 5 are substituted in the second phase function Φ' (h) shown in Expression (2) in order to obtain the outer circular side phase function curve (the second phase function curve) shown in FIG. 12, and the outer circular side tiered diffraction pattern portion 20c2 is formed based on a curve having a radius equal to or above 1.25 mm in the outer circular side phase function curve. A tier height of tiers is set to approximately mλ-fold (where m is a natural number which does not include 0) of the designed wavelength λ in the outer circular side tiered diffraction pattern portion 20c2 formed in a tiered shape, and the outer circular side tiered diffraction pattern portion 20c2 has the tiers ascending toward a higher position than the inner circular side tiered diffraction pattern portion 20a1 and is formed to the outer side of the outer circular portion diameter φD2.

In this example, in regard to connection of the inner circular side tiered diffraction pattern portion 20c1 with the outer circular side tiered diffraction pattern portion 20c2, the diffractive optical element 20' having the excellent performances can be obtained by setting the substrate thickness of the outer circular side tiered diffraction pattern portion 20c2 higher than an average wavefront of the inner circular side tiered diffraction pattern portion 20c1 by approximately 3λ-fold of the designed wavelength λ. In this example, even when determining the average wavefront of the inner circular side tiered diffraction pattern portion 20c1 as a reference, it is needless to say that it is desirable to set such a height that an optical phase difference is not generated between the inner and outer areas with the reference wavelength of the first laser light L1 depending on a total thickness obtained from an average value and a thickness to be added.

Further, an actual shape of the outer circular side tiered diffraction pattern portion 20c2 of the diffractive optical element 20' takes a conformation of a discrete tiered shape with a phase width of approximately 2 mπ (which is an approximately integral multiple of the designed wavelength λ), where m is a natural number which does not include 0, in the second phase function Φ'(h). As a result, the tier height of the tiers is a height that a difference in optical path length is approximately m-fold of the designed wavelength λ (408 nm). Then, with the wavelength which is approximately mλ-fold of the designed wavelength λ, a wavefront does not substantially vary with respect to the first laser light L1 having the reference wavelength λ1 of 408 nm transmitted through the outer circular side tiered diffraction pattern portion 20c2 of the diffractive optical element 20'. When the wavelength of the first laser light L1 is changed, a wavefront change is generated in accordance with a phase structure.

In this example, as to the outer circular side phase function curve (the second phase function curve) obtained based on the second phase function Φ'(h), when a value of the continuous smooth outer circular side phase function curve is approximated to a discrete value as shown in FIG. 12, an error between these values (which can be a quantization error) is an error of the wavefront, and mainly becomes a diffraction loss. Specifically, although the light transmittance is reduced in some measure, a range of changes in wavelength is small in the vicinity of the reference wavelength λ1 of the first laser light L1 for to the Blu-ray Disc 1. Therefore, this reduction is small and does not practically become a problem. Furthermore, since an annular structure is very fine, an influence of the wavefront error on a spot formed by the objective lens 21 can be regarded as an aberration of a component of a higher order. Therefore, such an aberration is hardly produced and can be ignored.

Furthermore, when a value of m mentioned above is set to, e.g., 1, as shown in FIGS. 25A and 25B, the tier height of the tiers of the outer circular side tiered diffraction pattern portion 20c2 becomes approximately 1λ-fold of the designed wavelength λ. In this case, as shown in FIG. 13 in an enlarged manner, since the outer circular side tiered diffraction pattern portion 20c2 is sectionalized in a tiered shape so that the tier height of the tiers becomes approximately 1λ-fold of the designed wavelength λ with respect to the outer circular side phase function curve, the outer circular side tiered diffraction pattern portion 20c2 has a primary structure.

Further, when a value of m mentioned above is set to, e.g., 2 (or a natural number m equal to or above 2), as shown in FIG. 26, the tier height of the tiers of the outer circular side tiered diffraction pattern portion 20c3 becomes approximately 2λ-fold (or approximately mλ-fold) of the designed wavelength λ. In this case, as shown in FIG. 14 in an enlarged manner, when the outer circular side tiered diffraction pattern portion 20c3 is sectionalized in a tiered shape so that the tier height of the tiers becomes approximately 2λ-fold (approximately mλ-fold . . . not shown) of the designed wavelength λ with respect to the outer circular side phase function curve, the outer circular side tiered diffraction pattern portion 20c3 has a secondary (or higher-order . . . not shown) structure.

Moreover, when a value of m mentioned above is changed and set in accordance with each tier in the tiered structure, as shown in FIG. 27, there is obtained an aperiodic structure in which the tier height of the tiers of the outer circular side tiered diffraction pattern portion 20c4 varies in accordance with each tier.

It is to be noted that the diffractive optical element 20' shown in FIGS. 25 to 27 is manufactured based on the inner circular side phase function curve (the first phase function curve) and the outer circular side phase function curve (the second phase function curve) shown in FIGS. 11 and 12, but just a concept of the diffractive optical element 20 is illustrated. The irregular portions on the inner circular side, the number of tiers on the outer circular side, a relationship in tiers between the inner circular side and the outer circular side, a pitch of the circular zone and others are not accurately drawn, but they are conceptually illustrated.

Additionally, in this Embodiment 2, when the outer circular side has the structure of a higher order (a second order or above) or the aperiodic structure, a large pitch (interval) of the tiers in the outer circular side tiered diffraction pattern portions 20c3 and 20c4 can be likewise set, and there is a merit that production of the diffractive optical element 20' can be facilitated.

Based on this, since the function which changes an aberration due to a wavelength error with respect to the first laser light L1 by transmission of the first laser light L1 only is added by such a diffraction structure of the tiers that a difference in optical path length between tiers is an approximately integral multiple of the first laser light L1 for the Blu-ray Disc, the outer circular side tiered diffraction pattern portion 20c2 or 20c3 or 20c4 formed in the outer circular area of the diffractive optical element 20' can perform the correction concerning a chromatic aberration. On the other hand, since the second laser light L2 for the DVD is not transmitted through this pattern portion, this light does not act on this portion at all.

An operation when the optical system in Embodiment 2 is used will now be described.

Figure 28:
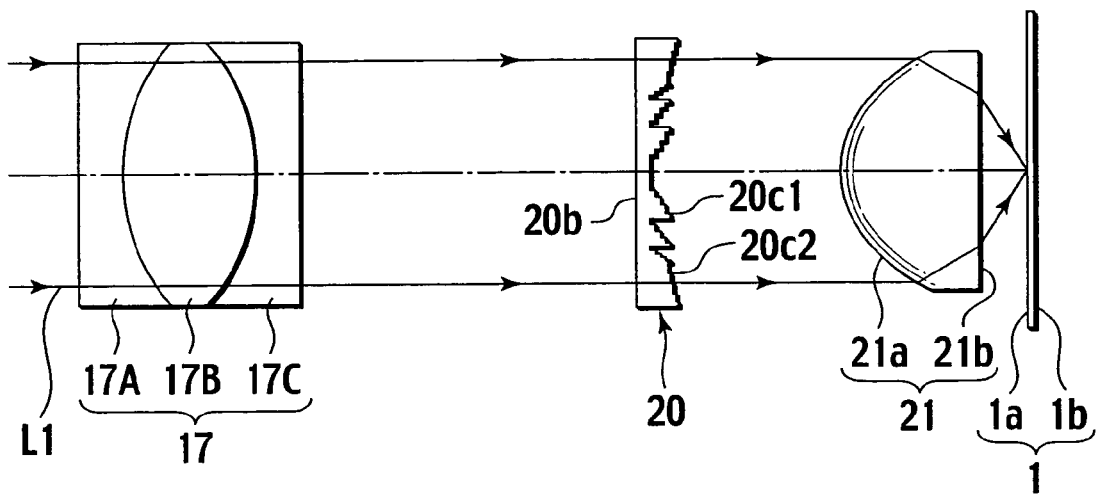
FIG. 28 is a light path view in the Blu-ray Disc in Embodiment 2.
Figure 29:
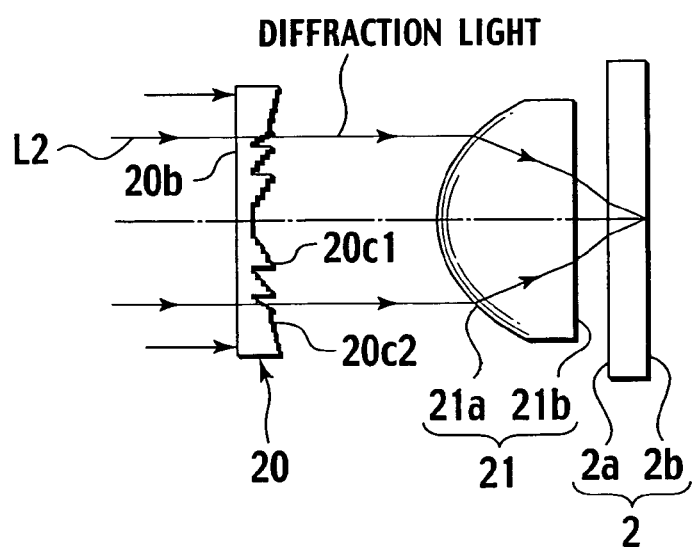
FIG. 29 is a light path view in the DVD in Embodiment 2.

FIG. 28 is an optical path view in the Blu-ray Disc in Embodiment 2. FIG. 29 is an optical path view in the DVD in Embodiment 2.

First, in Embodiment 2, a chromatic aberration correction element 17 formed by attaching a concave lens 17A, a convex lens 17B and the concave lens 17C is arranged on the blue semiconductor laser 11 (FIG. 7) side when recording or reproducing information onto or from the Blu-ray Disc 1 by the optical system shown in FIG. 28.

Further, the first laser light L1 exiting from the blue semiconductor laser 11 (FIG. 7) is converted into a parallel light by a collimator lens 14 (FIG. 7), and the parallel light obtained from the first laser light L1 is caused to enter the inner circular area and the outer circular area of the under-surface 20b of the diffractive optical element 20' through the chromatic aberration correction element 17. Then, the first laser light L1 is transmitted through the inner circular side tiered diffraction pattern portion 20c1 and the outer circular side tiered diffraction pattern portion 20c2 as it is, and caused to enter the surface 21a of the objective lens 21 while remaining as the parallel light.

At this time, although the tier height of each tier set in the inner circular side tiered diffraction pattern portion 20c1 of the diffractive optical element 20' is set to approximately 2λ-fold of the designed wavelength λ as described in conjunction with FIGS. 25A and 25B, the inner circular side tiered pattern portion 20c1 does not act on the first laser light L1 at all and causes 0-order diffraction light to enter the objective lens 21. On the other hand, since the tier height of each tier in the outer circular side tiered diffraction pattern portion 20c2 is set to approximately 1λ-fold of the designed wavelength λ as described with reference to FIGS. 25A and 25B, the wavefront is not changed with respect to the first laser light L1 whose reference wavelength λ1 is 408 nm, but the outer circular side tiered diffraction pattern portion 20c2 corrects a chromatic aberration with respect to the wavelength slightly deviating from the reference wavelength λ1.

It is to be noted that such a secondary (or higher-order . . . not shown) structure as shown in FIG. 26 or such an aperiodic structure as shown in FIG. 27 can be also adopted as the diffractive optical element 20'.

Furthermore, the first laser beam narrowed down by the objective lens 21 is caused-to enter from the laser beam incidence surface 1a of the Blu-ray Disc 1 and condensed on the signal surface 1b having the disc substrate thickness of 0.1 mm.

In this case, when information is recorded on or reproduced from the Blu-ray Disc 1, an influence of a spherical aberration is as very small as substantially zero. Therefore, the excellent characteristics can be obtained with respect to the Blu-ray Disc 1.

Next, in Embodiment 2, when recording or reproducing information on or from the DVD 2 by the optical system shown in FIG. 29, the chromatic aberration correction element is not arranged on the red semiconductor laser 31 (FIG. 7) side, the second laser light L2 exiting from the red semiconductor laser 31 (FIG. 7) is converted into a parallel light by the collimator lens 34 (FIG. 7), and the parallel light of the second laser light L2 is caused to enter the inner circular area only of the undersurface 20b of the diffractive optical element 20'. Thereafter, the second laser light L2 is caused to enter the surface 21a of the objective lens 21 while correcting a spherical aberration by the $1^{st}$ order diffraction light diffracted by the inner circular side tiered diffraction pattern portion 20c1 of the diffractive optical element 20'.

Then, the second laser beam narrowed down by the objective lens 21 is caused to enter the laser beam incidence surface 2a of the DVD 2 and condensed on the signal surface 2b having the disc substrate thickness of 0.6 mm.

In this case, since the objective lens 21 is designed for the Blu-ray Disc, a spherical aberration becomes large with respect to the second laser light L2 having the wavelength λ2 of 655 nm exiting from the red semiconductor laser 31 (FIG. 7), but the spherical aberration is corrected by using the inner circular side tiered diffraction pattern portion 20c1 of the diffractive optical element 20'. Therefore, recording or reproduction of information onto or from the DVD 2 is not obstructed.

It should be understood that many modifications and adaptations of the invention will become apparent to those skilled in the art and it is intended to encompass such obvious modifications and changes in the scope of the claims appended hereto.

What is claimed is:

1. An optical pickup device which selectively records or reproduces a first optical recording medium, and a second optical recording medium having a recording density lower than that of the first optical recording medium and a substrate thickness larger than that of the first optical recording medium, comprising:

a first laser light source which emits a first laser light whose wavelength is not more than 450 nm in accordance with the first optical recording medium;

a second laser light source which emits a second laser light whose wavelength is longer than that of the first laser light in accordance with the second optical recording medium;

a chromatic aberration correction element which corrects a chromatic aberration with respect to the first laser light;

first and second laser light separating means for separating the first laser light and the second laser light from each other;

a diffractive optical element which corrects a spherical aberration generated due to a difference in substrate thickness between the first and second recording mediums; and an objective lens which has a numerical aperture (NA) set to 0.75 or above for the first optical recording medium, in which at least one of respective surfaces thereof backing onto each other is formed into an aspherical surface and which converges the first and second laser lights on the respective signal surfaces of the first and second optical recording mediums, wherein, when a wavelength having the same value as a reference wavelength λ1 of the first laser light is set to a designed wavelength λ, the diffractive optical element has: an inner circular side irregular diffraction pattern portion, in which a plurality of irregular portions in which a height of a convex portion is set to approximately 1λ-fold of the designed wavelength λ with respect to a concave portion are repeated, being formed in an annular shape in an inner circular area having a predetermined diameter for the correction of a spherical aberration generated due to a difference in substrate thickness between the first and second optical recording mediums centering on a central point through which an optical axis runs while gradually changing a pitch of the irregular portions in a radial direction toward the outer circular side; and an outer circular side tiered diffraction pattern portion which is intended to improve a chromatic aberration with respect to the first laser light by forming in an annular shape in an outer circular area outside the inner circular side irregular diffraction pattern portion a plurality of tiers by setting a height of each tier to approximately mλ-fold (where m is a natural number which does not include 0) of the designed wavelength λ or by setting the same while changing a value of m for each tier.

2. An optical pickup device which selectively records or reproduces a first optical recording medium, and a second optical recording medium having a recording density lower than that of the first optical recording medium and a substrate thickness larger than that of the first optical recording medium, comprising:

a first laser light source which emits a first laser light whose wavelength is not more than 450 nm in accordance with the first optical recording medium;

a second laser light source which emits a second laser light whose wavelength is longer than that of the first laser light in accordance with the second optical recording medium;

a chromatic aberration correction element which corrects a chromatic aberration with respect to the first laser light;

first and second laser light separating means for separating the first laser light and the second laser light from each other;

a diffractive optical element which corrects a spherical aberration generated due to a difference in substrate thickness between the first and second recording mediums; and an objective lens which has a numerical aperture (NA) set to 0.75 or above for the first optical recording medium, in which at least one of respective surfaces thereof backing onto each other is formed into an aspherical surface and which converges the first and second laser lights on the respective signal surfaces of the first and second optical recording mediums, wherein, when a wavelength having the same value as a reference wavelength $\lambda 1$ of the first laser light is set to a designed wavelength $\lambda$, the diffractive optical element has: an inner circular side tiered diffraction pattern portion, in which a plurality of tiers each having a height set to approximately $2\lambda$-fold of the designed wavelength $\lambda$ are determined as one set and the plurality of such sets are repeated, being formed in an annular shape in an inner circular area having a predetermined diameter for the correction of a spherical aberration generated due to a difference in substrate thickness between the first and second optical recording mediums centering on a central point through which an optical axis runs while gradually changing a pitch of the tiers in a radial direction toward the outer circular side; and an outer circular side tiered diffraction pattern portion which is intended to improve a chromatic aberration with respect to the first laser light by forming in an annular shape in an outer circular area outside the inner circular side tiered diffraction pattern portion a plurality of tiers by setting a height of each tier to approximately $m\lambda$-fold (where m is a natural number which does not include 0) of the designed wavelength $\lambda$ or by setting the same while changing a value of m for each tier.

3. A diffractive optical element which corrects a spherical aberration generated due to a difference in substrate thickness between a first recording medium having a small substrate thickness and a second optical recording medium having a substrate thickness larger than that of the first recording medium when selectively recording or reproducing the first optical recording medium and the second optical recording medium by using a first laser light having a wavelength which is not more than 450 nm for the first optical recording medium and a second laser light having a wavelength longer than that of the first laser light for the second optical recording medium, wherein, when a wavelength having the same value as a reference wavelength $\lambda 1$ of the first laser light is set to a designed wavelength $\lambda$, the diffractive optical element has: an inner circular side irregular diffraction pattern portion, in which a plurality of irregular portions in which a height of a convex portion is set to approximately $1\lambda$-fold of the designed wavelength $\lambda$ with respect to a concave portion are repeated, being formed in an annular shape in an inner circular area having a predetermined diameter for the correction of the spherical aberration generated due to the difference in substrate thickness between the first and second optical recording mediums centering on a central point through which an optical axis runs while gradually changing a pitch of the irregular portions in a radial direction toward the outer circular side; and an outer circular side tiered diffraction pattern portion which is intended to improve a chromatic aberration with respect to the first laser light by forming in an annular shape in an outer circular area outside the inner circular side irregular diffraction pattern portion a plurality of tiers by setting a height of each tier to approximately $m\lambda$-fold (where m is a natural number which does not include 0) of the designed wavelength $\lambda$ or by setting the same while changing a value of m for each tier.

4. A diffractive optical element which corrects a spherical aberration generated due to a difference in substrate thickness between a first recording medium having a small substrate thickness and a second optical recording medium having a substrate thickness larger than that of the first recording medium when selectively recording or reproducing the first optical recording medium and the second optical recording medium by using a first laser light having a wavelength which is not more than 450 nm for the first optical recording medium and a second laser light having a wavelength longer than that of the first laser light for the second optical recording medium, wherein, when a wavelength having the same value as a reference wavelength $\lambda 1$ of the first laser light is set to a designed wavelength $\lambda$, the diffractive optical element has: an inner circular side tiered diffraction pattern portion, in which a plurality of tiers each having a height set to approximately $2\lambda$-fold of the designed wavelength $\lambda$ are determined as one set and the plurality of such sets are repeated, being formed in an annular shape in an inner circular area having a predetermined diameter for the correction of the spherical aberration generated due to the difference in substrate thickness between the first and second optical recording mediums centering on a central point through which an optical axis runs while gradually changing a pitch of the tiers in a radial direction toward the outer circular side; and an outer circular side tiered diffraction pattern portion which is intended to improve a chromatic aberration with respect to the first laser light by forming in an annular shape in an outer circular area outside the inner circular side tiered diffraction pattern portion a plurality of tiers by setting a height of each tier to approximately $m\lambda$-fold (where m is a natural number which does not include 0) of the designed wavelength $\lambda$ or by setting the same while changing a value of m for each tier.

* * * * *